(12) United States Patent
Yamashita et al.

(10) Patent No.: US 7,925,395 B2
(45) Date of Patent: Apr. 12, 2011

(54) ROLLOVER JUDGING DEVICE

(75) Inventors: Toshiyuki Yamashita, Tokyo (JP); Shinichi Harase, Tokyo (JP); Satoru Inoue, Tokyo (JP); Takashi Tokunaga, Tokyo (JP); Takashi Furui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 706 days.

(21) Appl. No.: 11/922,335

(22) PCT Filed: Feb. 22, 2007

(86) PCT No.: PCT/JP2007/053311
§ 371 (c)(1),
(2), (4) Date: Dec. 17, 2007

(87) PCT Pub. No.: WO2007/141936
PCT Pub. Date: Dec. 13, 2007

(65) Prior Publication Data
US 2009/0118892 A1   May 7, 2009

(30) Foreign Application Priority Data
Jun. 6, 2006 (JP) .................... 2006-157571

(51) Int. Cl.
*B60R 21/13* (2006.01)
*G06F 19/00* (2006.01)
(52) U.S. Cl. ............ 701/29; 701/45; 701/91; 280/5.502
(58) Field of Classification Search ............... 701/29, 701/45, 46, 91, 93, 41; 280/5.502, 5.506, 280/5.507
See application file for complete search history.

(56) References Cited

U.S. PATENT DOCUMENTS

| | | | |
|---|---|---|---|
| 6,141,604 A | 10/2000 | Mattes et al. | |
| 6,755,274 B2 | 6/2004 | Mattes et al. | |
| 6,796,397 B2 | 9/2004 | Lahmann et al. | |
| 7,017,700 B2 | 3/2006 | Frimberger et al. | |
| 7,729,829 B2 * | 6/2010 | Messih et al. ................. | 701/37 |
| 2004/0167701 A1 * | 8/2004 | Mattson et al. ............... | 701/71 |
| 2006/0267750 A1 * | 11/2006 | Lu et al. ....................... | 340/440 |

FOREIGN PATENT DOCUMENTS

| | | |
|---|---|---|
| DE | 196 09 176 | 9/1997 |
| DE | 100 10 633 | 9/2001 |
| DE | 101 18 062 | 10/2002 |
| DE | 101 23 215 | 12/2002 |
| JP | 9-104320 A | 4/1997 |

(Continued)

*Primary Examiner* — Tan Q Nguyen
(74) *Attorney, Agent, or Firm* — Birch, Stewart, Kolasch & Birch, LLP

(57) ABSTRACT

A rollover judging device adjusts the magnitude of an angular velocity component ω of a vehicle in a direction of a rollover, which is measured by an angular velocity sensor 1, by using an ω adjusting unit 3c on the basis of an acceleration component of the vehicle in its rightward or leftward direction or in its upward or downward direction, which is measured by an acceleration sensor 2, calculates an angle component θo by integrating with respect to time this adjusted angular velocity component ωo by using an integrator 3d, carries out predetermined multiplication and addition processes by using a judging means 4 on the basis of this angle component θo and the measured angular velocity component ω, and, when the result of this addition process exceeds a preset threshold Th, outputs a signal indicating judgment of occurrence of a rollover to an air bag control device 5.

22 Claims, 10 Drawing Sheets

FOREIGN PATENT DOCUMENTS

| | | |
|---|---|---|
| JP | 2001-71787 A | 3/2001 |
| JP | 2001-71844 A | 3/2001 |
| JP | 2001-74442 A | 3/2001 |
| JP | 2001-260700 A | 9/2001 |
| JP | 2001-260784 A | 9/2001 |
| JP | 2001-260786 A | 9/2001 |
| JP | 2002-200951 A | 7/2002 |
| JP | 2002-331903 A | 11/2002 |
| JP | 2003-335214 A | 11/2003 |
| JP | 2005-205960 A | 8/2005 |
| JP | 3715146 B2 | 9/2005 |
| JP | 2006-4-4454 A | 2/2006 |
| JP | 2006-62602 A | 3/2006 |

* cited by examiner (a)

(b)

(c)

(a)

(b)

(c)

(d)

(a)

(b)

(c)

(d)

(a) ωs (or θ0)

(b) Δω (or Δθ0)

(c) ωs (or θ0)

(d) Δω (or Δθ0)

(a)

(b)

(a)

(b)

ROLLOVER JUDGING DEVICE

FIELD OF THE INVENTION

The present invention relates to a rollover (rollover) judging device which provides an improvement in its reliability using an occurrence pattern of the acceleration of a vehicle in a rightward or leftward direction or the like.

BACKGROUND OF THE INVENTION

In a rollover judging method for use in conventional rollover judging devices, a two-dimensional mapping method of mapping an angular velocity ω and a tilt angle θv is used, and a method of setting ON and OFF regions on mapping in advance, and of, when (ω, θv) is pointed in the ON region, triggering an occupant crash protection device, such as an air bag, is used. As a rollover judging device which employs another example of the two-dimensional mapping method, there is the following conventional example.

In the mapping method for use in this conventional rollover judging device, in order to start an occupant crash protection according to a rotation of a vehicle in its rightward or leftward direction, a judgment threshold is set up for each of the first quadrant and the third quadrant, and this judgment threshold is changed according to the acceleration Gy of the vehicle in its rightward or leftward direction. More specifically, the judgment threshold itself is set as a variable, and the angular velocity ω and the tilt angle θv also change according to the behavior of the vehicle (for example, refer to patent reference 1).

In addition to the above-mentioned reference, there have been provided following patent references 2 to 4 as conventional technologies relevant to rollover judgment.

[Patent reference 1] JP,2001-71844,A
[Patent reference 2] Japanese Patent No. 3715146
[Patent reference 3] JP,2001-71787,A
[Patent reference 4] JP,2001-74442,A Conventional rollover judging devices are constructed as mentioned above, and, in these conventional rollover judging devices, the judgment threshold itself is set as a variable, and the angular velocity ω and the tilt angle θv also change according to the behavior of the vehicle. A problem is therefore that for each of the first quadrant and the third quadrant, a computation of the judgment threshold and a judging process are needed, and the process is complicated.

A further problem with the process using the two-dimensional mapping method in the above-mentioned conventional example (patent reference 1) is that it is difficult to show how much it gets close to the threshold in actual vehicle driving tests, i.e., to express the severity of the rollover phenomenon using a simple percentage.

The present invention is made in order to solve the above-mentioned problems, and it is therefore an object of the present invention to provide a rollover judging device which has a simple structure without using a complicated process like the above-mentioned two-dimensional mapping method, which makes it possible to show the severity of the rollover phenomenon using a simple percentage, and which simplifies arithmetic processing by setting a judgment threshold not as a variable but as a fixed value, thereby improving its reliability.

DESCRIPTION OF THE INVENTION

In accordance with the present invention, there is provided a rollover judging device including: an angular velocity sensor for measuring an angular velocity component of a vehicle in a direction of a rollover of the vehicle; an acceleration sensor for measuring either of at least an acceleration component of the vehicle in a rightward or leftward direction and an acceleration component of the vehicle in an upward or downward direction; an integration processing means for adjusting a magnitude of the angular velocity component measured by the above-mentioned angular velocity sensor on a basis of the acceleration component measured by the above-mentioned acceleration sensor, and for calculating an angle component by integrating with respect to time the above-mentioned adjusted angular velocity component; and a judging means for multiplying the angular velocity component measured by the above-mentioned angular velocity sensor and the angle component calculated by the above-mentioned integration processing means by preset weighting factors, respectively, and for outputting a signal indicating judgment of occurrence of a rollover when an absolute value of a sum of the above-mentioned components multiplied by the preset weighting factors, respectively, exceeds a preset threshold.

The rollover judgment device in accordance with the present invention adjusts the magnitude of the angular velocity component measured by the angular velocity sensor on the basis of either of at least the acceleration component of the vehicle in its rightward or leftward direction and the acceleration component of the vehicle in its upward or downward direction, calculates the angle component by integrating with respect to time the adjusted angular velocity component, performs the predetermined multiplication and addition processes on the basis of this calculated angle component and the measured angular velocity component mentioned above, and outputs a signal indicating judgment of occurrence of a rollover when the addition result exceeds the preset threshold. Therefore, the rollover judging device can judge whether or not the vehicle is rolling over with a simple structure without using complicated processing such as processing based on a conventional two-dimensional mapping method. Furthermore, because the rollover judging device sets the threshold which is used as a criterion of the judgment of occurrence of a rollover as a fixed value other than a variable which is conventionally used, the rollover judging device can simplify the arithmetic processing, thereby improving its reliability.

In addition, because the rollover judging device is so constructed as to multiply the measured angular velocity component measured and the calculated angle component by the preset weighting factors, respectively, and output a signal indicating judgment of occurrence of a rollover when the absolute value of the sum of the components multiplied by the preset weighting factors, respectively, exceeds the fixed threshold, how much the absolute value approaches the threshold in actual vehicle driving tests and so on, i.e., the severity of the rollover phenomenon can be expressed using a simple percentage.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
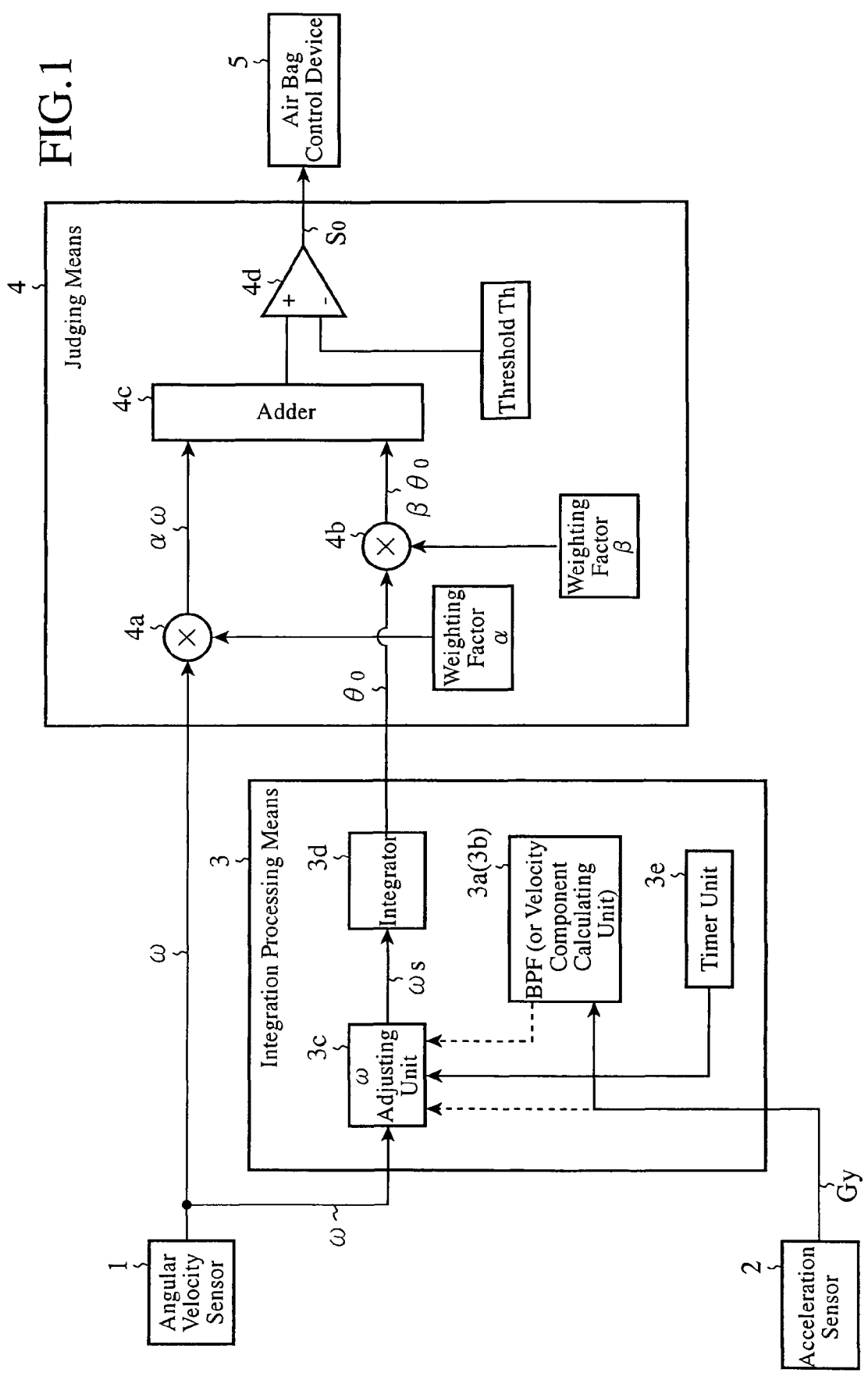
FIG. 1 is a block diagram showing the structure of a rollover judging device in accordance with Embodiment 1 of the present invention.

FIG. 1 is a block diagram showing the structure of a rollover judging device in accordance with Embodiment 1 of the present invention.

In FIG. 1, the rollover judging device in accordance with this Embodiment 1 is comprised of an angular velocity sensor 1, an acceleration sensor 2, an integration processing means 3, and a judging means 4. An air bag control device 5 is disposed as a next stage of this judging means 4.

In the above-mentioned structure, the angular velocity sensor 1 measures an angular velocity component of a vehicle in a direction of the vehicle's rollover, and outputs a signal showing the angular velocity ω. This angular velocity sensor 1 is also called a roll rate sensor.

The acceleration sensor 2 measures at least either one of an acceleration component of the vehicle in a rightward or leftward direction of the vehicle and an acceleration component of the vehicle in an upward or downward direction of the vehicle. In the following explanation, assume that the acceleration sensor 2 measures and outputs the acceleration component Gy of the vehicle in its rightward or leftward direction.

The integration processing means 3 calculates an angle component θo on the basis of the angular velocity ω inputted from the angular velocity sensor 1, and is comprised of a band pass filter 3a (referred to as "BPF 3a" from here on) (or a velocity component calculating unit 3b), an angular velocity (ω) adjusting unit 3c (referred to as "an ω adjusting unit 3c" from here on), an integrator 3d, and a timer unit 3e.

In the structure of this integration processing means 3, the BPF 3a extracts an acceleration component in a preset specific oscillation (frequency) region from the acceleration component Gy of the vehicle in its rightward or leftward direction which is measured by the acceleration sensor 2. For this extraction, a frequency band to pass is preset to the BPF 3a.

The velocity component calculating unit 3b calculates a velocity component Vy by integrating with respect to time the acceleration component Gy of the vehicle in its rightward or leftward direction, which is measured by the acceleration sensor 2.

This velocity component calculating unit 3b is used as an alternative to the BPF 3a (as will be mentioned below).

The ω adjusting unit 3c adjusts a percentage or absolute value of the angular velocity ω inputted from the angular velocity sensor 1 according to the acceleration component extracted by the BPF 3a, the acceleration component Gy of the vehicle in its rightward or leftward direction which is measured by the acceleration sensor 2, or the magnitude of the velocity component Vy calculated by the velocity component calculating unit, and outputs the percentage or absolute value as an angular velocity ωs.

The integrator 3d integrates with respect to time the angular velocity ωs inputted from the ω adjusting unit 3c, and calculates an angle component θo.

The timer unit 3e measures a preset fixed time period, and, when it is necessary to make the ω adjusting unit 3c continue its adjustment state of the angular velocity ω, measures a time duration that the ω adjusting unit is placed in its adjustment state. For example, when the acceleration component extracted by the BPF 3a is larger than a preset threshold, even if this acceleration component becomes small, the ω adjusting unit continues a state in which it adjusts the angular velocity ω to be smaller (as will be mentioned below), and the timer unit 3e measures a time duration of the ω adjusting unit's stay in this state.

The judging means 4 is comprised of a multiplier 4a, a multiplier 4b, an adder 4c, and a comparator 4d.

In the structure of this judging means 4, the multiplier 4a multiplies the angular velocity ω inputted from the angular velocity sensor 1 by a weighting factor α, and outputs "αω." This weighting factor α is preset to the judging means 4.

The multiplier 4b multiplies the angle component θo inputted from the integrator 3d of the integration processing means 3 by a weighting factor β, and outputs "βθo." This weighting factor β is also preset to the judging means 4.

The adder 4c adds "αω" inputted from the multiplier 4a and "βθo" inputted from the multiplier 4b, and outputs "αω+βθo."

The comparator 4d compares the absolute value of "αω+βθo" inputted to a positive-phase input terminal (+) thereof from the adder 4c with a threshold Th preset to an inverted input terminal (−) thereof, and, when this absolute value of "αω+βθo" exceeds the threshold Th, outputs a decision signal So showing expansion of an air bag to the air bag control device 5.

Next, prior to explanation of the operation of the above-mentioned structure shown in FIG. 1, a measurement object of the angular velocity sensor (roll rate sensor) 1, various traveling modes of the vehicle, etc. which are basic points of this explanation of the operation will be explained with reference to FIG. 2.

Figure 2:
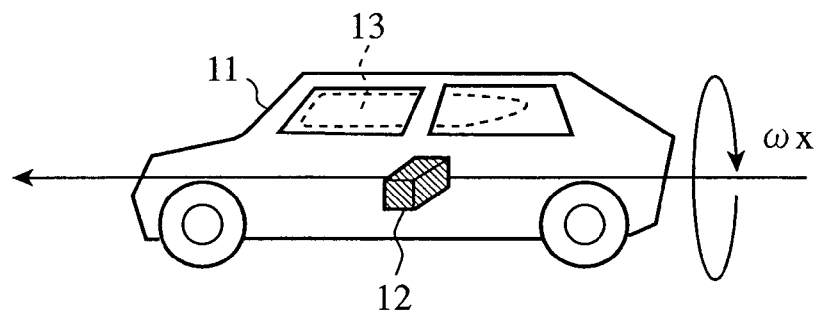
FIG. 2 is an explanatory drawing of an measurement object of a angular velocity sensor of the rollover judging device in accordance with Embodiment 1 of the present invention, and an angular velocity component in various travelling modes of a vehicle.
Figure 2:
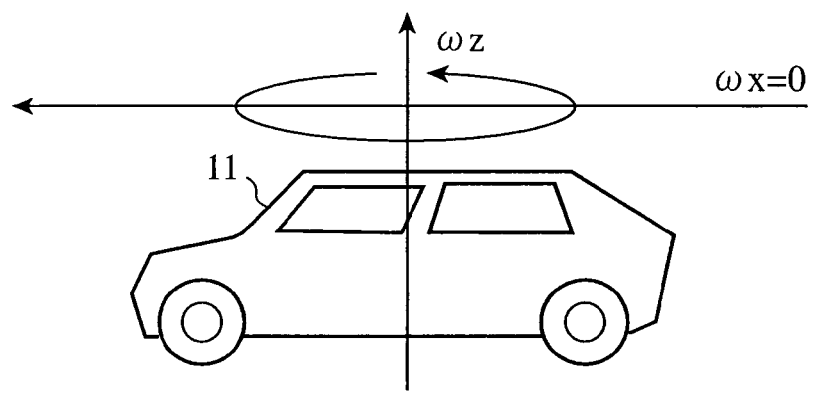
Figure 2:
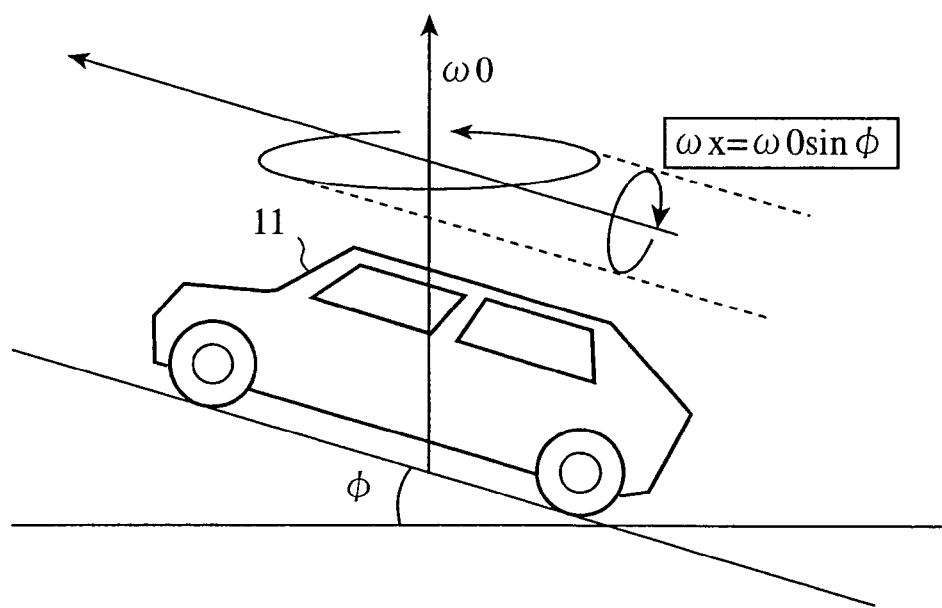

FIG. 2 is an explanatory drawing of a measurement object of the angular velocity sensor (roll rate sensor) 1, and the angular velocity component which appears in each of various traveling modes of the vehicle, FIG. 2(a) shows the measurement object of the angular velocity sensor 1, FIG. 2(b) shows the angular velocity component which appears in a turning traveling mode, and FIG. 2(c) shows the angular velocity component which appears in either a spiral traveling mode or a rough road traveling mode.

In FIG. 2(a), the angular velocity sensor 1 which functions as a roll rate sensor is arranged to detect the roll rate component ωx of the vehicle 11 at a time when the vehicle rolls over (rollover).

The airbag control unit 12 including the structure of FIG. 1 is installed in a central part of the vehicle 11, and an air bag 13 is installed in a side wall of the vehicle. When the vehicle 11 enters a rollover state, the airbag control unit 12 outputs a driving signal to the air bag 13 disposed in the side wall so as to control the air bag 13 to expand this air bag, thereby protecting passengers at the time when the vehicle rolls over.

In FIG. 2(b), in the turning traveling mode in which the vehicle 11 is turning on a horizontal plane, only a yaw rate (rotation) component ωz appears, but the above-mentioned roll rate component ωx which is the measurement object of the angular velocity sensor does not appear.

In FIG. 2(c), in the spiral traveling mode in which the vehicle 11 is turning with being inclined in its longitudinal direction when it is travelling on a curved mountain road or the like, or in the rough road traveling mode in which the vehicle is travelling on a rough road with a large degree of roughness, a roll rate component ωx (=ωo Sin φ) appears for a turning component ωo even though the vehicle is not rolling. This ωx (=ωo Sin φ) is an unnecessary component (another axial component) which is not related with the roll angle of the vehicle 11.

Next, the operation of FIG. 1 will be explained.

The rollover judging device of the present invention is characterized in that when calculating the angle by integrating the angular velocity ω of the vehicle measured by the angular velocity sensor 1, the rollover judging device increases or decreases the ratio of the integration according to the occurrence pattern of the acceleration component Gy of the vehicle in its rightward or leftward direction. In the structure of this FIG. 1, the ω adjusting unit 3c increases or decreases the ratio of the integration by adjusting the magnitude of the angular velocity ω according to the occurrence pattern of the acceleration component Gy.

The following forms (1) to (3) can be provided as this adjustment of the magnitude of the angular velocity ω.

The form (1) of adjusting the ratio or absolute value of the angular velocity ω on the basis of the acceleration component extracted by the BPF 3a;

The form (2) of adjusting the ratio or absolute value of the angular velocity ω on the basis of the acceleration component Gy of the vehicle in its rightward or leftward direction which is measured by the acceleration sensor 2; and The form (3) of adjusting the ratio or absolute value of the angular velocity ω on the basis of the velocity component Vy calculated by the velocity component calculating unit 3b.

First, the form (1) will be explained.

The form (1) of adjusting the ratio or absolute value of the angular velocity ω on the basis of the acceleration component extracted by the BPF 3a.

This form (1) will be explained with reference to FIGS. 3 and 4.

Figure 3:
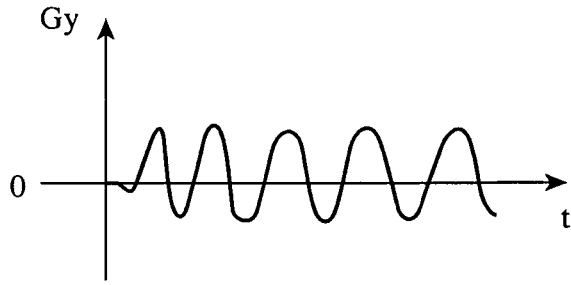
FIG. 3 is an explanatory drawing of suppression of integration in a rough road traveling mode in the rollover judging device in accordance with Embodiment 1 of the present invention.
Figure 3:
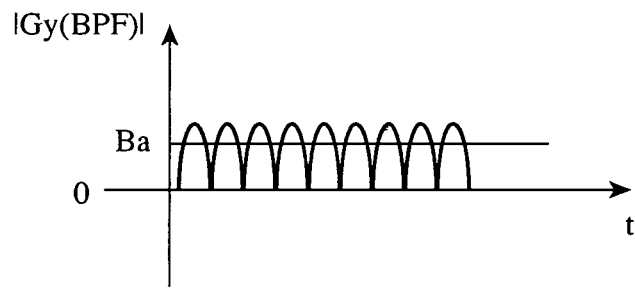
Figure 3:
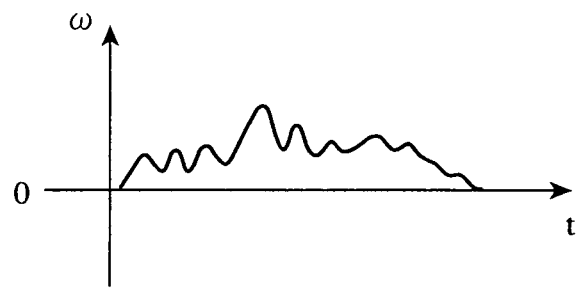
Figure 3:
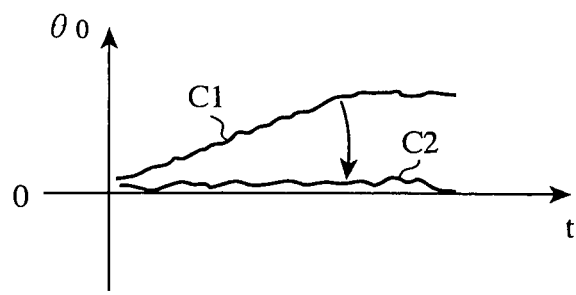

FIG. 3 is an explanatory drawing of suppression of the integration in the rough road traveling mode explained with reference to FIG. 2. FIG. 3(a) is a waveform chart of an example of the acceleration component Gy of the vehicle in its rightward or leftward direction which is measured by the acceleration sensor 2 in the rough road traveling mode, FIG. 3(b) is a waveform chart of an example of the acceleration component in a region of oscillations specific to the vehicle, the acceleration component being extracted by the BPF 3a, FIG. 3(c) is a waveform chart of an example of the angular velocity ω measured by the angular velocity sensor 1, and FIG. 3(d) is a waveform chart (expressed as an absolute value) of an example of the integration obtained by the integrator 3d. The horizontal axis of each chart shown in above-mentioned FIGS. 3(a) to 3(d) shows a time (t).

Figure 4:
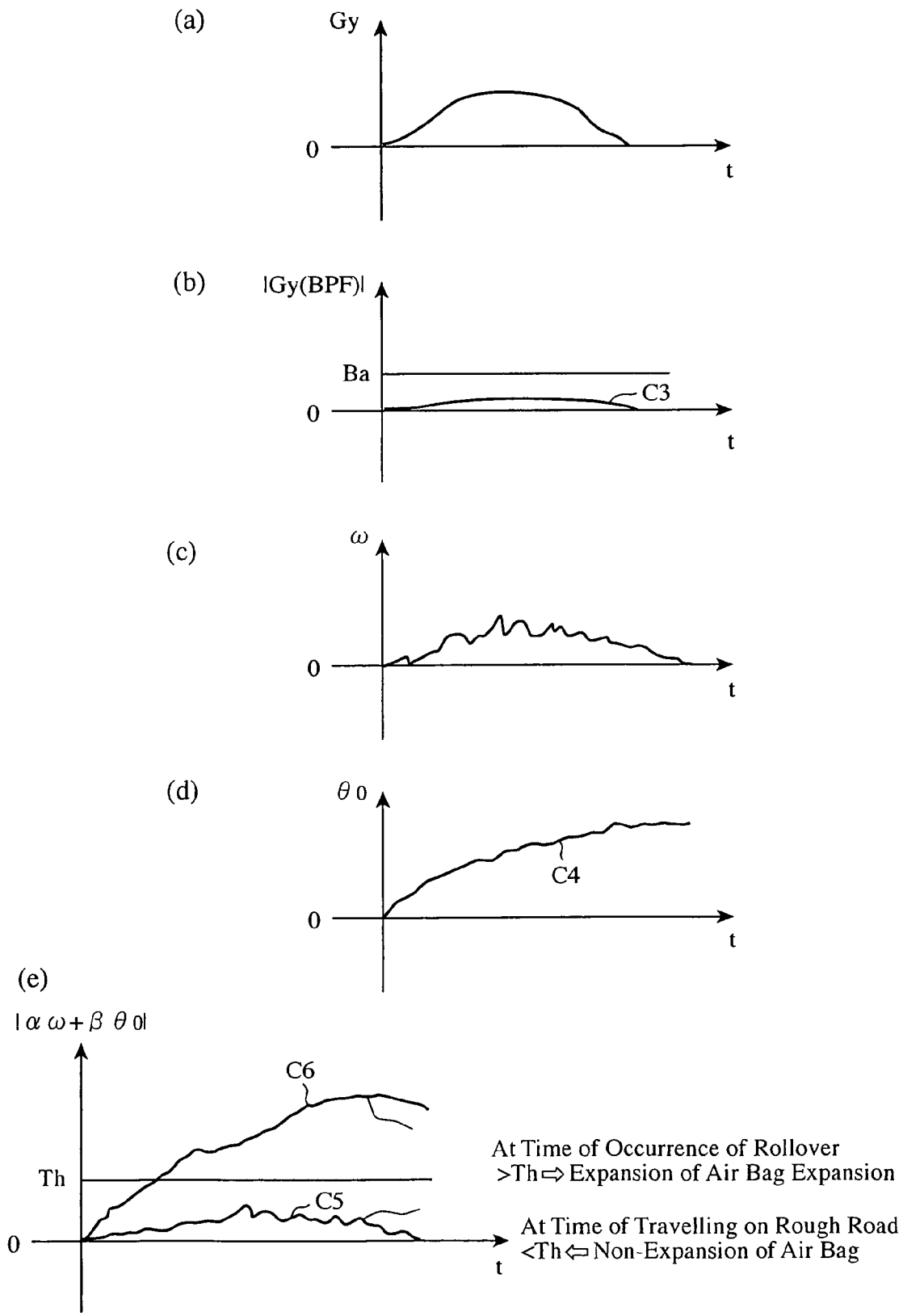
FIG. 4 is an explanatory drawing of the integration at a time of a rollover and judgment of expansion of an air bag in the rollover judging device in accordance with Embodiment 1 of the present invention.

FIG. 4 is an explanatory drawing of the integration at the time of occurrence of a rollover, and judgment of expansion of the air bag. FIG. 4(a) is a waveform chart of an example of the acceleration component Gy of the vehicle in its rightward or leftward direction which is measured by the acceleration sensor 2 at the time of occurrence of a rollover, FIG. 4(b) is an explanatory drawing of the component extracted by the BPF 3a, FIG. 4(c) is a waveform chart of an example of the angular velocity ω measured by the angular velocity sensor 1, FIG. 4(d) is a waveform chart of an example of the integration obtained by the integrator 3d, and FIG. 4(e) is an explanatory drawing showing judgment performed by the judging means 4. The horizontal axis of each drawing shown in above-mentioned FIGS. 4(a) to 4(e) shows a time (t).

When the vehicle is travelling on a rough road, a signal indicating the acceleration component Gy of the vehicle in its rightward or leftward direction as shown in FIG. 3(a), which is measured by the acceleration sensor 2 of FIG. 1, is inputted to the BPF 3a, and the acceleration component (FIG. 3(b)) in the preset oscillation region which is specific to the vehicle is extracted from the acceleration component Gy by this BPF 3a.

As shown in FIG. 3(a), in the rough road traveling mode, an oscillation of a high frequency having a waveform alternating between positive and negative polarities appears in the acceleration component Gy. In the BPF 3a to which this oscillation waveform is inputted, oscillations other than the preset specific oscillation (frequency) region are attenuated and the acceleration component having the oscillation waveform of FIG. 3(b) indicating the rough road traveling mode is extracted. This extracted acceleration component is a component unnecessary for the rollover judgment. The level of this extracted acceleration component is changed to a larger or smaller one according to the rough road traveling state. Therefore, a threshold Ba is preset up for this extracted acceleration component.

The signal indicating the angular velocity ω shown in FIG. 3(c) and measured by the angular velocity sensor 1 is dividedly inputted to the ω adjusting unit 3c of the integration processing means 3, and the multiplier 4a of the judging means 4.

The ratio or absolute value of the angular velocity ω indicated by the signal inputted to the ω adjusting unit 3c is adjusted according to the level of the acceleration component of FIG. 3(b) extracted by the BPF 3a, and the adjusted signal is outputted as the angular velocity Gs. When the acceleration component extracted by the BPF 3a exceeds the above-mentioned threshold Ba, the ω adjusting unit 3c carries out this adjustment of the ratio or absolute value in such a manner that the larger the acceleration component exceeding this threshold Ba, the smaller value the angular velocity ωs has (ω>ωs). The angular velocity ωs which has been adjusted in this way and is outputted from the ω adjusting unit 3c is inputted to the integrator 3d.

The integrator 3d which has accepted the above-mentioned angular velocity ωs integrates with respect to time the angular velocity ωs so as to calculate an angle component θo. The angle component θo is given by "θo=∫ωs(ω,Gy,Gz)dt."

In the time integration performed by this integrator 3d, as shown in FIG. 3(d), the time integrated value indicating the angle component θo becomes smaller and the integration is further suppressed as the angular velocity ωs indicated by the signal is adjusted to be smaller. An integral waveform C1 of FIG. 3(d) shows a case in which no integration suppression is carried out, and an integral waveform C2 shows a case in which integration suppression is carried out. For example, in a case in which the integral waveform C1 is an assumed one which is obtained by directly integrating with respect to time the angular velocity ω inputted to the ω adjusting unit 3c from the angular velocity sensor 1, the actually-integrated result obtained by the integrator 3d has the integral waveform C2 on which integration suppression is performed. The degree of this integration suppression becomes larger as the unnecessary acceleration component extracted by the BPF 3a becomes larger. Thus, a signal indicating the angle component θo which is the output of the integrator 3d on which integration suppression is performed is inputted to the multiplier 4b of the judging means 4.

When the vehicle is travelling on a rough road as previously explained, the integration processing means 3 at the time of occurrence of a rollover operates as shown in FIG. 4.

At the time of occurrence of a rollover, the acceleration component Gy of the vehicle in its rightward or leftward direction which is measured by the acceleration sensor 2 of FIG. 1 has a waveform as shown in FIG. 4(a). It is clear, from a comparison between this waveform shown in FIG. 4(a) and the above-mentioned waveform shown in FIG. 3(a) at the time of the vehicle's travelling on a rough road, that the acceleration component has a smooth waveform which does not have any high-frequency oscillation at the time of occurrence of a rollover. Furthermore, the acceleration component has a waveform which does not have both positive and negative polarities, but has only a unidirectional (positive) polarity.

The reason why the waveform of the acceleration component has only a unidirectional polarity is because a centrifugal force occurs only in one direction at the time of occurrence of a rollover. Thus, the acceleration component Gy of the vehicle in its rightward or leftward direction which is measured by the acceleration sensor 2 differs greatly between at the time of the vehicle's travelling on a rough road and at the time of occurrence of a rollover. Therefore, the BPF 3a that is preset in such a manner as to extract the acceleration component in the region of specific oscillations which occur at the time of the vehicle's travelling on a rough road has little components to be extracted at the time of occurrence of a rollover, as shown in FIG. 4(b), and at most a component C3 having a minimum level which does not reach the threshold Ba may be extracted.

Therefore, the ω adjusting unit 3c outputs the angular velocity ω shown in FIG. 4(c) inputted from the angular velocity sensor 1 to the integrator 3d as "ωs=ω" without adjusting the ratio or absolute value of the angular velocity ω. The integrator 3d integrates with respect to time the angular velocity ωs inputted thereto to calculate an angle component θo. No integration suppression is performed on this angle component θo because the ω adjusting unit 3c integrates with respect to time the angular velocity ωs (=the angular velocity ω) on which no adjustment of the ratio or the like is performed, as mentioned above, the angle component θo becomes the one of the integral waveform C4 having a larger value than the angle component θo of the integral waveform C2 (FIG. 3(d)) (θo of C4>θo of C2), as shown in FIG. 4(d). In this way, at the time of occurrence of a rollover, the angle component θo having a larger value, as compared with that at the time of the vehicle's travelling on a rough road, is outputted from the integrator 3d.

The previously-explained angle component θo of the integrator 3d at the time of the vehicle's travelling on a rough road or at the time of occurrence of a rollover is sent out to the multiplier 4b of the judging means 4.

The multiplier 4a of the judging means 4 to which the signal indicating the angular velocity ω has been inputted from the angular velocity sensor 1 multiplies this angular velocity ω by the weighting factor α so as to calculate "αω", the multiplier 4b of the judging means 4 to which the angle component θo has been inputted from the integrator 3d multiplies this angle component θo by the weighting factor β so as to calculate "βθo", and signals indicating these "αω" and "βθo", respectively, are inputted into the adder 4c. The reason why the angular velocity or angle component is multiplied by the weighting factor α or β is because a future angle component increment is allowed for with the current angle θo.

The adder 4c adds "αω" and "βθo" which are inputted thereto, and calculates the absolute value of the addition result, and outputs a signal indicating the absolute value of "αω+βθo" to the positive-phase input terminal (+) of the comparator 4d. The comparator 4d compares the absolute value of "αω+βθo" inputted to the positive-phase input terminal (+) with the threshold Th which is preset to the reverse input terminal (−). When this absolute value of "αω+βθo" exceeds the threshold Th, the comparator outputs a decision signal So indicating expansion of the air bag to the air bag control device 5.

A judgment equation used for the above-mentioned judgment performed by the comparator 4d can be given by "|αω+βθo|>Th."

The judging means 4 multiplies the current angle θo by either the weighting factor α or the weighting factor β as the future angle component increment, as mentioned above, calculates the absolute value of the multiplication result so as to judge the magnitude, and compares this absolute value with the threshold Th. Therefore, the judging means does not need to use a complicated process like the two-dimensional mapping, and further sets the threshold Th itself to a fixed value. In this case, a maximum of computed values which are obtained in a non-rollover mode in which it is not necessary to expand the air bag is set as the threshold Th.

FIG. 4(e) shows a comparison judgment performed by the above-mentioned comparator 4d. The vertical axis of this FIG. 4(e) shows "|αω+βθo|" which is the addition result output (the absolute value) of the adder 4c, and the threshold Th is set up on this vertical axis.

In FIG. 4(e), a waveform C5 corresponds to the integral waveform C2 of FIG. 3(d) at the time of the vehicle's travelling on a rough road, and a waveform C6 corresponds to the integral waveform C4 of FIG. 4(d) at the time of occurrence of a rollover.

As shown in FIG. 4(e), a level relation between "|αω+βθo|" at the time of the vehicle's travelling on a rough road (waveform C5) and the threshold Th is given by "|αω+βθo|<threshold Th", and therefore the judgment done by the judging means 4 shows non-expansion of the air bag. In contrast with this, a level relation between "|αω+βθo|" at the time of occurrence of a rollover (waveform C6) and the threshold Th is given by "|αω+βθo|>threshold Th", and therefore the judgment done by the judging means 4 shows expansion of the air bag and a decision signal So indicating expansion of the air bag is outputted to the air bag control device 5.

When the explanation of the above-mentioned judgment is applied to above-mentioned FIG. 2(a), the structure of FIG. 1 (including the air bag control device 5) is equivalent to the airbag control unit 12 of FIG. 2(a), and, when this airbag control unit 12 judges that "|αω+βθo|>Th" is established, the airbag control unit outputs a driving signal to the air bag 13 disposed in a side wall of the vehicle so as to expand the air bag 13.

In the above explanation, it is assumed that the acceleration sensor 2 measures and outputs the acceleration component Gy of the vehicle in its rightward or leftward direction. As an alternative, the acceleration sensor 2 can measure at least either one of the acceleration component of the vehicle in its rightward or leftward direction and the acceleration component of the vehicle in the upward or downward direction, and, instead of the above-mentioned acceleration component Gy of the vehicle in its rightward or leftward direction, can acquire the acceleration component of the vehicle in the upward or downward direction or a vector including the acceleration component of the vehicle in its rightward or leftward direction and the acceleration component of the vehicle in the upward or downward direction, and can provide the same advantages as those in the case of measuring the acceleration component Gy.

The same goes for the following Embodiments 2 and 3.

Next, the form (2) will be explained.

The form (2) of adjusting the ratio or absolute value of the angular velocity ω on the basis of the acceleration component Gy of the vehicle in its rightward or leftward direction which is measured by the acceleration sensor 2.

This form (2) differs from the above-mentioned form (1) in that the adjustment performed by the ω adjusting unit 3c of the integration processing means 3 is based on the acceleration sensor 2, instead of the BPF 3a, and the form (2) is the same as the above-mentioned form (1) except for this point. Therefore, an operation different from that in the above-mentioned form (1) will be explained mainly, and the explanation of the same operation as that of the form (1) will be omitted hereafter.

This form (2) will be explained with reference to FIG. 5.

Figure 5:
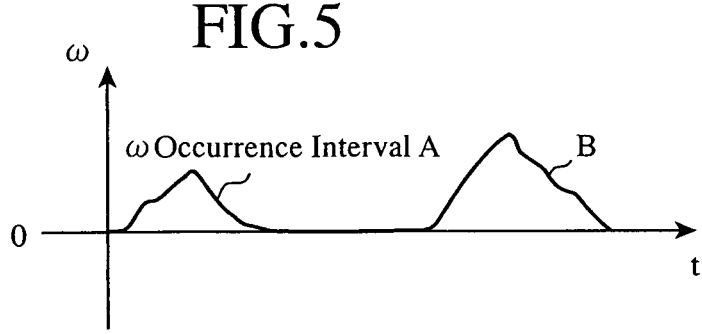
FIG. 5 is an explanatory drawing of integration processing carried out by the rollover judging device in accordance with Embodiment 1 of the present invention.
Figure 5:
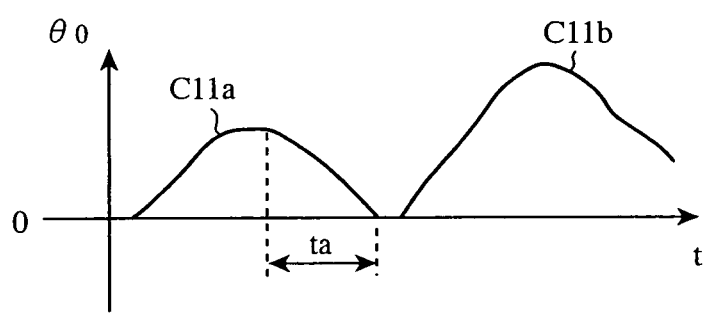
Figure 5:
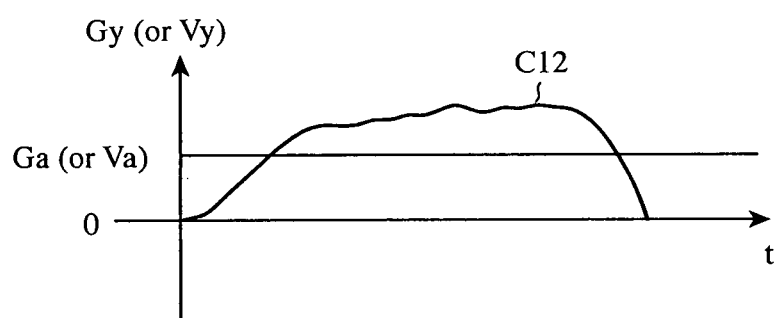
Figure 5:
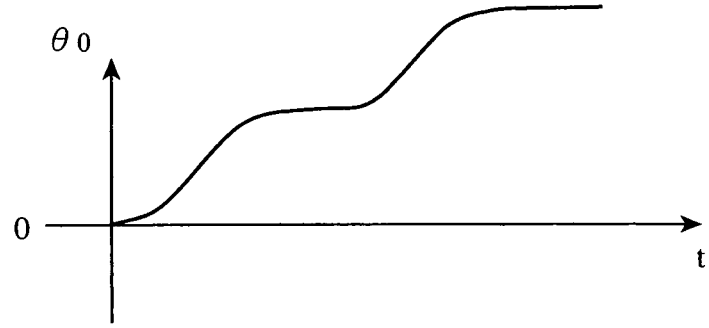

FIG. 5 is an explanatory drawing of the integration processing, FIG. 5(a) is a waveform chart of an example of the angular velocity ω measured by the angular velocity sensor 1, FIG. 5(b) is a waveform chart of an example of the integration performed by the integrator 3d, FIG. 5(c) is a waveform chart of an example of the acceleration component Gy of the vehicle in its rightward or leftward direction which is measured by the acceleration sensor 2, and FIG. 5(d) is a waveform chart of an example of the integration performed by the integrator 3d. The horizontal axis of each chart shown in above-mentioned FIGS. 5(a) to 5(d) shows a time (t).

Hereafter, assume that in a certain traveling state, the angular velocity sensor 1 measures the angular velocity ω having a waveform as shown in FIG. 5(a). This FIG. 5(a) shows that the angular velocity ω has occurred in both of an occurrence interval A and an occurrence interval B. Between the occurrence interval A and the occurrence interval B, the angular velocity ω becomes substantially zero temporarily.

In the case in which the angular velocity ω has thus occurred in the two intervals, in a conventional structure in which no acceleration sensor 2 is disposed, the angular velocity ω during the occurrences interval A and the angular velocity ω during the occurrence interval B are handled as different events (events).

Therefore, when the angular velocity ω of FIG. 5(a) is integrated with respect to time by the integrator 3d, an integrated output, as shown in FIG. 5(b), which consists of an integral waveform C11a which corresponds to the angular velocity ω during the occurrence interval A and an integral waveform C11b which corresponds to the angular velocity ω during the occurrence interval B is provided. A time interval ta during which the integral waveform C11a descends and then becomes an integral value 0 substantially shows an integral value return interval.

A phenomenon in which the angular velocity ω has occurred in the two intervals, as shown in this FIG. 5(a), may also occur at either of the time of the vehicle's travelling on a rough road and the time of occurrence of a rollover. For example, when the vehicle rolls over (rollover) through two steps, the angular velocity ω as shown in FIG. 5(a) may occur. It is however difficult for a conventional structure in which no acceleration sensor 2 is disposed to judge whether the angular velocity ω has resulted from the vehicle's state of traveling on a rough road or the vehicle's state of rolling over. Therefore, there is a possibility that it is not judged that a rollover has occurred in the vehicle even if the angular velocity ω as shown in FIG. 5(a) is measured.

Such a malfunction is canceled by using the acceleration component Gy of the vehicle in its rightward or leftward direction which is measured by the acceleration sensor 2. More specifically, the ratio or absolute value of the angular velocity ω is adjusted by using the measured acceleration component Gy.

For example, assume that while the angular velocity ω as shown in FIG. 5(a) is measured by the angular velocity sensor 1, the acceleration component Gy as shown in FIG. 5(c) is measured by the acceleration sensor 2.

A threshold Ga is preset up for the acceleration component Gy as shown in this FIG. 5(c), and, when the measured acceleration component Gy having a waveform C12 exceeds this threshold Ga, it is judged that the vehicle has been rolling over, and the angular velocity ω which appears during the occurrence interval A and the angular velocity ω which appears during the occurrence interval B are handled as an identical event.

Therefore, the ω adjusting unit 3c adjusts the angular velocity ωs in such a manner that the larger the acceleration component Gy exceeding the threshold Ga is, the larger value the angular velocity ωs has. The angular velocity ωs which is adjusted by the ω adjusting unit 3c in this way is inputted to the integrator 3d.

The integrator 3d to which the above-mentioned angular velocity ωs has been inputted integrates with respect to time the angular velocity ωs to calculate an angle component θo. The angle component θo which is calculated in this way has a waveform as shown in the waveform chart of FIG. 5(d), and the angle component θo has a larger value compared with that in the above-mentioned case of FIG. 5(b). This angle component θo of a large value is inputted to the multiplier 4b of the judging means 4, and the operation as explained in the above-mentioned form (1) is then carried out and judgment of whether or not the vehicle is rolling over is carried out by the judging means.

Next, the form (3) will be explained.

The form (3) of adjusting the ratio or absolute value of the angular velocity ω on the basis of the velocity component Vy calculated by the velocity component calculating unit 3b.

This form (3) differs from the above-mentioned forms (1) and (2) in that the adjustment performed by the ω adjusting unit 3c of the integration processing means 3 is based on the velocity component calculating unit 3b. Therefore, the BPF 3a becomes unnecessary. This form is the same as the above-mentioned form (1) or (2) except for the use of this velocity component calculating unit 3b. Therefore, an operation different from that in the above-mentioned form (1) or (2) will be explained mainly, and the explanation of the same operation as that of the form (1) or (2) will be omitted hereafter.

This form (3) will be explained with reference to above-mentioned FIG. 5.

In the above-mentioned form (2), the ratio of the angular velocity ω is adjusted on the basis of the acceleration component Gy of the vehicle in its rightward or leftward direction which is measured by the acceleration sensor 2. In contrast, in this form (3), the velocity component calculating unit 3b is disposed in the integration processing means 3, and this velocity component calculating unit 3b integrates with respect to time the acceleration component Gy of the vehicle in its rightward or leftward direction which is measured by the acceleration sensor 2 so as to calculate a velocity component Vy.

On the basis of this velocity component Vy, the ratio or absolute value of the angular velocity ω of the ω adjusting unit 3c is adjusted. Between this velocity component Vy and the acceleration component Gy, there is a relation of the velocity component Vy increasing with increase in the acceleration component Gy. Therefore, if the acceleration component Gy measured by the acceleration sensor 2 has a waveform as shown in above-mentioned FIG. 5(c), the velocity component Vy calculated by the velocity component calculating unit 3b also has a waveform similar to that shown in this FIG. 5(c).

Assuming that this FIG. 5(c) shows a waveform chart of the velocity component Vy, a threshold Va is also set up for this velocity component Vy in advance. When the velocity component Vy calculated by the velocity component calculating unit 3b then exceeds this threshold Va, as in the case of the above-mentioned form (2), it is judged that the vehicle has been rolling over, and the angular velocity ω which appears during the occurrence interval A of FIG. 5(a) and the angular velocity ω which appears during the occurrence interval B of FIG. 5(a) are handled as an identical event.

Therefore, the ω adjusting unit 3c adjusts the angular velocity ωs in such a manner that the larger the velocity component Vy exceeding the threshold Va is, the larger value the angular velocity ωs has. The angular velocity ωs which is adjusted by the ω adjusting unit 3c in this way is inputted to the integrator 3d.

The integrator 3d to which the above-mentioned angular velocity ωs has been inputted integrates with respect to time the angular velocity ωs to calculate an angle component θo as shown in the waveform chart of FIG. 5(d), as in the case of the above-mentioned form (2). The angle component θo shown in FIG. 5(d) has a larger value compared with that in the case of FIG. 5(b). This angle component θo of a large value is inputted to the multiplier 4b of the judging means 4, and the operation as explained in the above-mentioned form (1) is then carried out and judgment of whether or not the vehicle is rolling over is carried out by the judging means.

Next, concrete adjustment examples of adjusting the ratio or absolute value of the angular velocity ω in each of the above-mentioned forms (1) to (3) will be explained with reference to FIG. 6.

Figure 6:
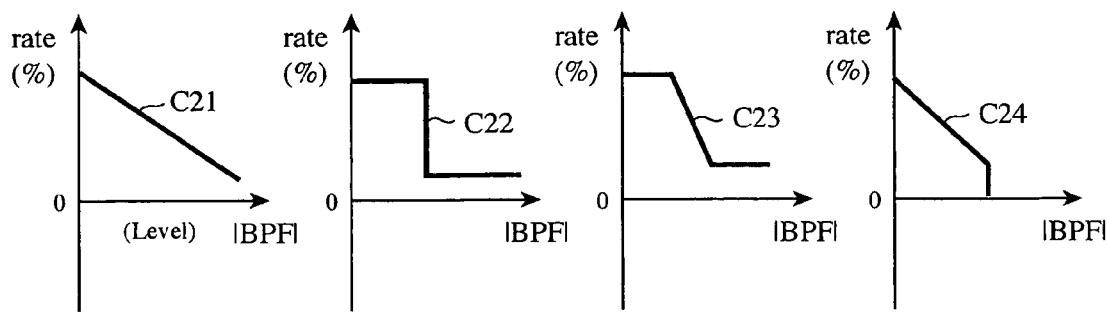
FIG. 6 is a relation diagram showing examples of adjustment of the angular velocity ω in the rollover judging device in accordance with Embodiment 1 of the present invention.
Figure 6:
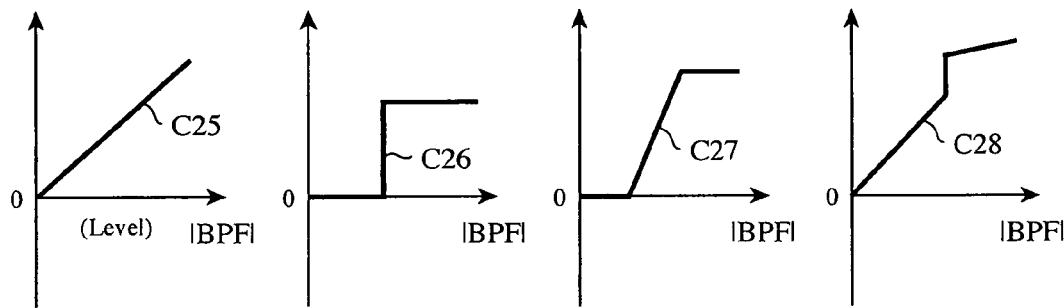
Figure 6:
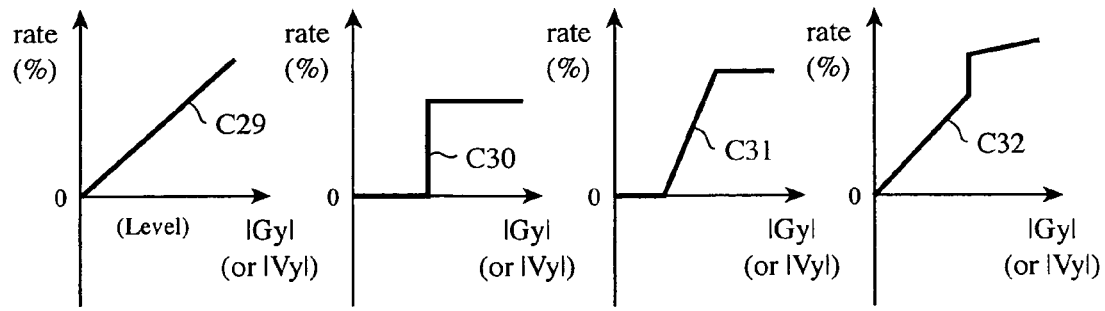
Figure 6:
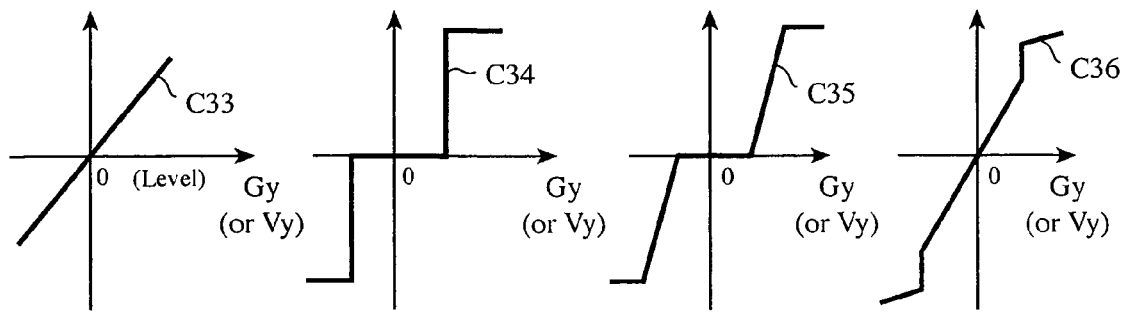

FIG. 6 is a relation drawing showing the examples of the adjustment of the angular velocity ω, FIG. 6(a) is a drawing showing a relation between the absolute value level of the acceleration component extracted by the BPF 3a and the rate of the angular velocity ωs (rate (%)), FIG. 6(b) is a drawing showing a relation between the absolute value level of the acceleration component extracted by the BPF 3a and the level of the angular velocity ωs, FIG. 6(c) is a drawing showing a relation between the absolute value level of the acceleration component Gy measured by the acceleration sensor 2 (or Vy) and the rate of the angular velocity ωs (rate (%)), and FIG. 6(d) is a drawing showing a relation between the level of the acceleration component Gy measured by the acceleration sensor 2 (or Vy) and the level of the angular velocity ωs.

The examples of adjusting the angular velocity ω according to the level of the acceleration component extracted by the BPF 3a by using the ω adjusting unit 3c are roughly categorized into an example of adjusting the angular velocity ω using the rate (rate) of the angular velocity ω and an example of adjusting the angular velocity ω using the level of the angular velocity ω.

Among these examples, the adjustment example using the rate (rate) of the angular velocity ω is implemented according to, for example, either one of characteristic patterns C21 to C24 as shown in FIG. 6(a). "rate" on the vertical axis of this FIG. 6(a) shows the ratio (%) of the ω adjustment done by the ω adjusting unit 3c, and shows the rate of "ωs=ω×rate" in terms of the input/output level relation of the ω adjusting unit 3c. In this case, ω in the equation is the level of the angular velocity ω inputted from the angular velocity sensor 1, and ωs is the output level of the ω adjusting unit 3c.

It is clear from the expression of the vertical axis as "rate", as mentioned above, that the characteristic patterns C21 to C24 substantially show an overall tendency for the rate (rate) of the angular velocity ω to be adjusted to decrease in a range "from 100% to 0%" according to the level of the acceleration component extracted by the BPF 3a.

The example of adjusting the angular velocity ω using the absolute value level of the acceleration component extracted by the BPF 3a is implemented according to, for example, either one of characteristic patterns C25 to C28 shown in FIG. 6(b). "Δω" on the vertical axis of this FIG. 6(b) shows the amount of adjustment of ω by the ω0 adjusting unit 3c, and shows Δω of "ωs=ω−Δω" in terms of the input/output level relation of the ω adjusting unit 3c. In this case, ω and ωs in the equation are the same as those explained with reference to FIG. 6(a).

It is clear from the expression of the vertical axis as "Δω", as mentioned above, that the characteristic patterns C25 to C28 substantially show an overall tendency for "Δω" to be adjusted to increase according to the level of the acceleration component extracted by the BPF 3a. This adjustment means that the output level ωs of the ω adjusting unit 3c is adjusted in such a manner as to decrease according to the level of the acceleration component.

Similarly, the examples of adjusting the angular velocity ω of the ω adjusting unit 3c according to the acceleration component Gy measured by the acceleration sensor 2 are roughly categorized into an example of adjusting the angular velocity ω with the rate (rate) of the angular velocity ω, and an example of adjusting the angular velocity ω with the level of the angular velocity ω.

Among these examples, the adjustment example using the rate (rate) of the angular velocity ω is implemented according to, for example, either one of characteristic patterns C29 to C32 as shown in FIG. 6(c). "rate" on the vertical axis of this FIG. 6(c) is the same as that explained with reference to above-mentioned FIG. 6 (a). These patterns substantially show an overall tendency for the rate (rate) of the output angular velocity ωs to be adjusted so as to increase according to the magnitude of the acceleration component Gy.

The adjustment example using the acceleration component Gy level of the angular velocity ω is implemented according to, for example, either one of characteristic patterns C33 to C36 as shown in FIG. 6(d). In FIG. 6(d), the patterns are drawn so as to extend through positive and negative regions, depending upon the polarities (positive and negative polarities) of the acceleration component Gy measured.

"Δω" on the vertical axis of this FIG. 6(d) shows the amount of adjustment of ω by the ω adjusting unit 3c, and shows Δω of "ωs=ω+Δω" in terms of the input/output level relation of the ω adjusting unit 3c. In this case, ω and ωs in the equation are the same as those explained with reference to FIG. 6(a).

It is clear from the expression of the vertical axis as "Δω", as mentioned above, that the characteristic patterns C33 to C36 substantially show an overall tendency for "Δω" to be adjusted to increase according to the magnitude of the acceleration component Gy. This adjustment means that the output level ωs of the ω adjusting unit 3c is adjusted to increase according to the level of the acceleration component Gy.

The example (each example of (3)) of adjusting the angular velocity ω according to the velocity component Vy calculated by the velocity component calculating unit 3b using the ω adjusting unit 3c can be understood by replacing the acceleration Gy on the horizontal axis of above-mentioned FIG. 6(c) or 6(d) with the velocity Vy.

Which one of the characteristic patterns C21 to C36 mentioned above is selected can be arbitrarily determined.

Next, a structure of handling different events (events) as an identical event will be explained with reference to FIG. 7.

Figure 7:
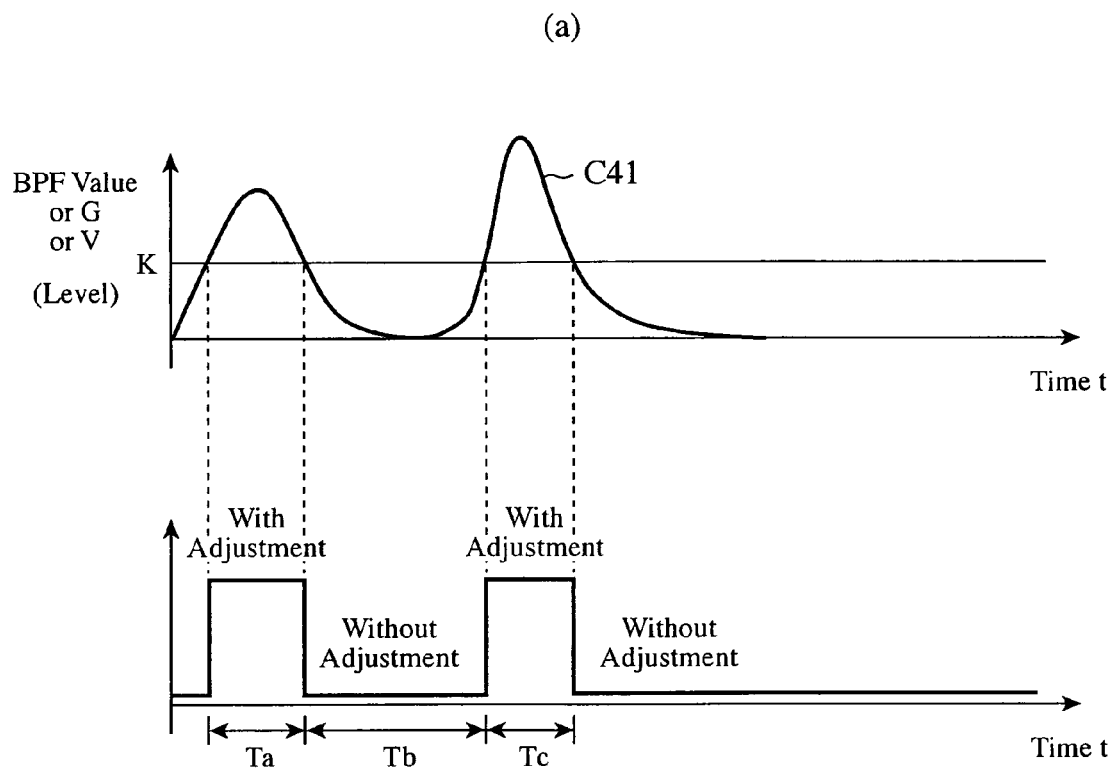
FIG. 7 is an explanatory drawing of a structure of handling as an identical event in the rollover judging device in accordance with Embodiment 1 of the present invention.
Figure 7:
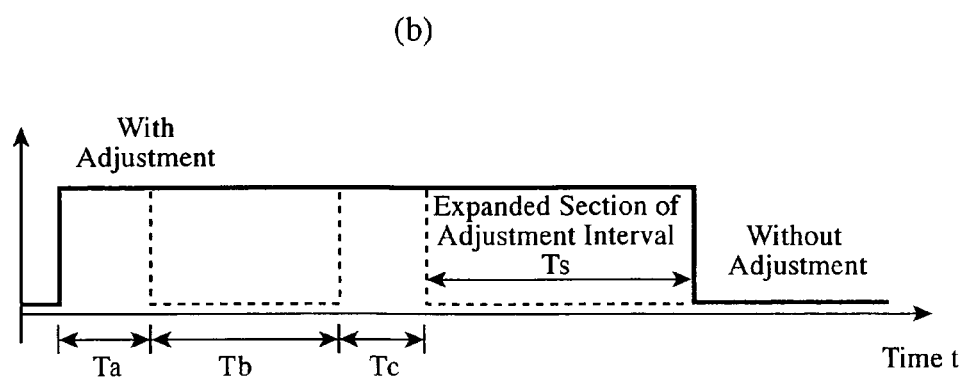

FIG. 7 is an explanatory diagram of the structure of handling different events as an identical event. FIG. 7(a) is an explanatory diagram of a criterion of judgment of whether to handle different events as an identical event, and FIG. 7(b) is an explanatory diagram of a process which is carried out when judging different events as an identical event.

As explained with reference to above-mentioned FIG. 5, there is a case in which events which can be assumed to occur separately result from an identical event including a series of those events in actuality. The judgment of whether those events have resulted from an identical event has a large influence upon the accuracy of the judgment of whether or not the vehicle is being in a rollover state.

In FIG. 7(a), a waveform C41 is shown with the horizontal axis showing a time (t) and the vertical axis showing the output value of the BPF, the acceleration G, or the velocity V. In this case, the BPF value is the level of the acceleration component extracted by the BPF 3a, G is the level of the acceleration component of the vehicle in its rightward or leftward direction or in its upward or downward direction which is measured by the acceleration sensor 2, and V is the level of the velocity component which is calculated by integrating with respect to time the above-mentioned G by using the velocity component calculating unit 3b.

A threshold (referred to as K) is set up for the above-mentioned waveform C41. This threshold K corresponds to the BPF value, G, or V. When the threshold K is defined so as to be associated with the explanation of each of the above-mentioned forms (1) to (3), K in the case of the BPF value is "K=Ba", K in the case of G is "K=Ga", and K in the case of V is "K=Va."

Each of Ta, Tb, and Tc shown in FIG. 7(a) indicates an interval with adjustment or without adjustment.

For example, in a case in which the waveform C41 is a waveform of the BPF value, the rate or the like of the angular velocity ω is adjusted when the BPF value exceeds the threshold K (=Ba), as explained in the above-mentioned form (1). The interval Ta during which the BPF value exceeds the threshold K (=Ba) is therefore an interval with adjustment. When the BPF value decreases after this interval Ta with adjustment and becomes lower than the threshold K, no adjustment of the angular velocity ω is carried out. Thus, the interval Tb without adjustment appears. The BPF value rises again after this interval Tb without adjustment, and the interval Tc with adjustment appears when the BPF value exceeds the threshold K again. When the BPF value decreases again after this interval Tc with adjustment and becomes lower than the threshold K, no adjustment of the angular velocity ω is carried out. Thus, an interval without adjustment appears.

In a case in which intervals with adjustment and intervals without adjustment appear alternately in this way, the integration processing means 3 judges them as an identical event, and, as shown in FIG. 7(b), carries out processes in such a manner as to extend the interval with adjustment by a fixed time interval Ts after the interval with adjustment is completed. As a result, the interval extending from the start of the interval Ta with adjustment to the end of the fixed time interval Ts becomes a continuous interval with adjustment, and an interval which appears after the fixed time interval Ts is completed becomes an interval without adjustment. This fixed time Ts is preset to the timer unit 3e of the integration processing means 3, and is measured and managed by the timer unit.

Although the above explanation is directed to the case in which the waveform C41 is a waveform of the BPF value, the integration processing means 3 similarly carries out processes even in a case in which this waveform C41 is a waveform of G or V.

With the above-mentioned structure, even when events which can be assumed to occur separately result from an identical event in actuality, the rollover judging device can deal with the events appropriately without carrying out a discontinuous process, thereby improving the accuracy of the judgment of whether or not the vehicle is being in a rollover state.

In each of the forms (1) to (3) previously explained, the acceleration component Gy of the vehicle in its rightward or leftward direction is measured by the acceleration sensor 2. The acceleration component of the vehicle measured by the acceleration sensor is not limited to this acceleration component Gy, and the acceleration component of the vehicle in the upward or downward direction can be alternatively measured.

As mentioned above, the rollover judging device in accordance with this Embodiment 1 is so constructed as to adjust the magnitude of the angular velocity component ω of the vehicle in a direction of the vehicle's rollover which is measured by the angular velocity sensor 1 on the basis of the acceleration component of the vehicle in its rightward or leftward direction or in its upward or downward direction, which is measured by the acceleration sensor 2, by using the ω adjusting unit 3c, calculate an angle component θo by integrating with respect to time this adjusted angular velocity component ωs by using the integrator 3d, carry out predetermined multiplication and addition processing on the basis of this angle component θo and the above-mentioned measured angular velocity component ω, and, when the result of this addition processing exceeds the preset threshold Th, output a signal So indicating judgment of occurrence of a rollover. Therefore, the rollover judging device can judge whether or not the vehicle is rolling over with a simple structure without using complicated processing such as processing based on a conventional two-dimensional mapping method. In other words, in the above-mentioned conventional example, it takes much time to carry out arithmetic processing because individual arithmetic processing is required for each of the first quadrant and the third quadrant. In contrast, in accordance with this Embodiment 1, because the arithmetic processing is simplified and speeded up and the power consumption is reduced, or the load on a CPU (central processing unit) in a case of using the CPU for the structure of FIG. 1 is reduced, and the judgment algorithm is simplified, the reliability of the rollover judging device can be improved.

For example, it is clear from a comparison between a case in which each of the thresholds is preset as a variable, as in the case of the above-mentioned conventional example, and a case in which each of the thresholds is preset as a fixed value, as in the case of this Embodiment 1, that the number of steps of decision processing can be reduced to approximately one half of that in the case of the above-mentioned conventional example.

In addition, because the acceleration component of the vehicle in its rightward or leftward direction is incorporated into the angle in advance, and therefore the threshold Th which is used as a criterion of the judgment of whether or not the vehicle is rolling over is also preset as a fixed value other than a variable which is conventionally used, the arithmetic logic can be simplified, the arithmetic processing can be speeded up, and therefore the reliability of the rollover judging device can be improved. Furthermore, this fixation of the threshold results in a smaller number of times that comparison for the judgment is carried out, and therefore the judgment of whether or not the vehicle is rolling over can be implemented by using a simple method.

In addition, because the BPF 3a for extracting an unnecessary component from the above-mentioned acceleration component is disposed in the integration processing means 3, and, when this unnecessary component has a magnitude larger than a predetermined threshold, the rollover judging device judges that the vehicle is travelling on a rough road and then adjusts the angular velocity ωs to be smaller according to the magnitude of this unnecessary component, the rollover judging device can suppress the time integration done by the integrator 3d, and can extract only conditions with a high degree of severity as the rollover mode.

As for the above-mentioned BPF 3a, because the vehicle oscillates in its rightward or leftward direction or in its upward or downward direction at an oscillation frequency specific to the vehicle when the vehicle is in the rough road traveling mode in which angular velocity components in different axis directions coexist, the rollover judging device calculates the magnitude of the oscillation component using the BPF 3a, and, when the magnitude of the calculated oscillation component is large, judges that the vehicle is in the rough road traveling mode, and reduces the angular velocity ωs so as to suppress the time integration.

Furthermore, when the above-mentioned acceleration component is larger than the predetermined threshold, the rollover judging device can increase the rate of the time integration done by the integrator 3d by adjusting the angular velocity ωs to be larger according to the magnitude of this acceleration component, and can extract only conditions with a high degree of severity as the rollover mode.

As for the above-mentioned acceleration component, when the acceleration of the vehicle in its rightward or leftward direction or in its upward or downward direction is large, because there is a high probability that passengers are moved to one side of the vehicle and are thrown out of the vehicle, the rollover judging device increases the angular velocity ωs and also increases the rate of the time integration so as to expand the air bag at an earlier timing when the acceleration of the vehicle in its rightward or leftward direction or in its upward or downward direction is large.

In addition, the velocity component calculating unit 3b which calculates the velocity component by integrating with respect to time the above-mentioned acceleration component is disposed in the integration processing means 3, and, when this velocity component is larger than a predetermined threshold, the rollover judging device can increase the rate of the time integration done by the integrator 3d by adjusting the angular velocity ωs to be larger according to the magnitude of this velocity component, and can extract only conditions with a high degree of severity as the rollover mode.

Also as for the above-mentioned velocity component, from the same reason as that in the case of the above-mentioned acceleration component, the rollover judging device increases the angular velocity ωs and also increases the rate of the time integration so as to expand the air bag at an earlier timing.

Furthermore, because the rollover judging device is so constructed as to multiply the measured angular velocity component ω and the calculated angle component θo by the weighting factors (α and β) having predetermined values, respectively, and to judge that the vehicle is rolling over when the absolute value of the sum of the multiplication results exceeds the threshold Th having a fixed value, how much the absolute value approaches the threshold in actual vehicle driving tests and so on, i.e., the severity of the rollover phenomenon can be expressed using a simple percentage.

For example, during the course of development of the device, the degree of severity can be checked in real time, a mode in which erroneous judgments are easily made can be extracted, and only a travelling state with a high degree of severity is made to occur repeatedly in driving tests so that a maximum value in a non-rollover mode which real vehicles can be assumed to enter can be grasped. The maximum value is then reflected in the device as the threshold, so that erroneous judgments can be prevented and a more reliable judgment can be made.

When the unnecessary component extracted by the BPF 3a is larger than the predetermined threshold, because the rollover judging device continues the state in which it adjusts the angular velocity component to be smaller for a fixed time interval after this unnecessary component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

As for the above-mentioned BPF 3a, when the oscillation component in the rightward or leftward direction or the upward or downward direction of the vehicle is large, the rollover judging device judges that the vehicle is travelling on a rough road and then suppresses the integral value.

In addition, when the above-mentioned acceleration component is larger than the predetermined threshold, because the rollover judging device continues the state in which it adjusts the angular velocity component to be larger for a fixed time interval after this acceleration component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

As for the above-mentioned acceleration component, when the acceleration of the vehicle in its rightward or leftward direction or in its upward or downward direction is large, the rollover judging device judges that the rollover mode is continuing, and continues the state in which it adjusts the angular velocity component to be larger for a fixed time interval so as to hold the integral value.

Furthermore, when the above-mentioned velocity component is larger than the predetermined threshold, because the rollover judging device continues the state in which it adjusts the angular velocity component to be larger for a fixed time interval after this velocity component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

Also as for the above-mentioned velocity component, from the same reason as that in the case of the above-mentioned acceleration component, the rollover judging device continues the state in which it adjusts the angular velocity component to be larger for a fixed time interval so as to hold the integral value.

Embodiment 2

Figure 8:
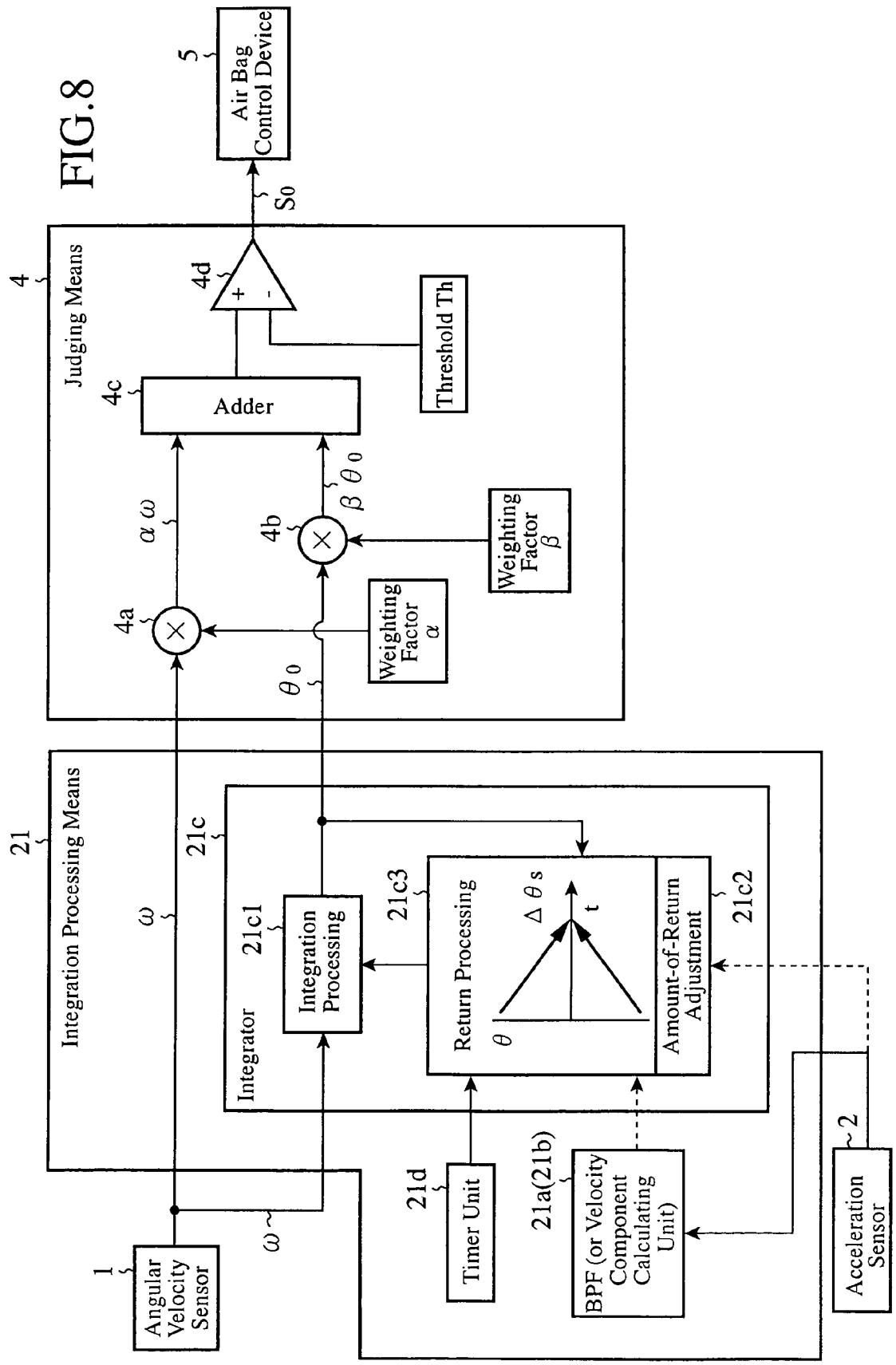
FIG. 8 is a block diagram showing the structure of a rollover judging device in accordance with Embodiment 2 of the present invention.

FIG. 8 is a block diagram showing the structure of a rollover judging device in accordance with Embodiment 2 of the present invention. The same components as those shown in FIG. 1 are designated by the same reference characters, respectively.

The structure shown in FIG. 8 differs from that shown in FIG. 1 in that an integration processing means 21 is disposed instead of the integration processing means 3 of FIG. 1, and the other components are the same as those in the structure shown in FIG. 1.

The integration processing means 3 of FIG. 1 increases or suppresses the rate of the integration by adjusting the rate of the angular velocity ω, etc. on the basis of the occurrence pattern of the acceleration component Gy of the vehicle in its rightward or leftward direction which is measured by the acceleration sensor 2. In contrast, the integration processing means 21 of this FIG. 8 adjusts the amount of return which is used for integral value return-to-zero processing in a case of carrying out integration processing on the basis of the occurrence pattern of the above-mentioned acceleration component Gy.

Therefore, in the following explanation, the integration processing means 21 which is the above-mentioned difference will be mainly explained and the explanation of the other components designated by the same reference characters as those shown in FIG. 1 will be omitted.

The integration processing means 21 calculates an angle component θo on the basis of the angular velocity ω inputted from the angular velocity sensor 1, and is comprised of a BPF 21a (or a velocity component calculating unit 21b), an integrator 21c, and a timer unit 21d. Among these components, the BPF 21a (or the velocity component calculating unit 21b) and the timer unit 21d have the same functions as the BPF 3a (or the velocity component calculating unit 3b) of FIG. 1 and the timer unit 3e, respectively, and the explanation of these components will be omitted hereafter.

The integrator 21c adjusts the amount of return (referred to as Δθs) which is used for the integral value return-to-zero processing on the basis of the acceleration component Gy of the vehicle in its rightward or leftward direction which is measured by the acceleration sensor 2, and also calculates an angle component θo by integrating with respect to time the angular velocity ω measured by the above-mentioned angular velocity sensor 1 and, after a lapse of a fixed time interval after the calculation has been carried out, carries out the return processing of returning the integral value to zero using the above-mentioned adjusted amount of return. In this function, an integration processing function 21c1 which forms the integrator 21c calculates the angle component θo by integrating with respect to time the angular velocity ω, a return amount adjusting function 21c2 adjusts the amount of return Δθs, and a return processing function 21c3 carries out the integral value return-to-zero processing using this adjusted amount of return Δθs after a lapse of the fixed time interval. The purpose of carrying out this return processing is to prevent any divergence of the integral value which is obtained through the above-mentioned time integration. To be more specific, the integrator 21c subtracts the adjusted amount of return Δθs from the integral value θo (θo−Δθs) when the integral value (the angle component) θo is positive (θo>0), whereas when the integral value θo is negative (θo<0), the integrator adds the adjusted amount of return Δθs to the integral value θo (θo+Δθs). By thus carrying out the return processing of subtracting the adjusted amount of return from the integral value or adding the adjusted amount of return to the integral value, the integration processing means suppresses any steep change.

In the following explanation, the integration processing means will be explained as the integrator 21c.

Next, the operation of the integration processing means 21 of FIG. 8 will be explained.

As mentioned above, while this integration processing means 21 adjusts the amount of return Δθs on the basis of the acceleration component Gy of the vehicle in its rightward or leftward direction which is measured by the acceleration sensor 2 and carries out the integral value return-to-zero processing using this adjusted amount of return Δθs, the integration processing means calculates the angle component θo by integrating with respect to time the angular velocity ω inputted from the angular velocity sensor 1. FIG. 8 shows a structure of carrying out a rollover judgment using this angle component θo calculated by the integration processing means 21.

The following forms (1) to (3) can be provided as adjustment of the above-mentioned amount of return Δθs, as in the case of Embodiment 1.

The form (1) of adjusting the amount of return Δθs on the basis of the acceleration component extracted by the BPF 3a;

The form (2) of adjusting the amount of return Δθs on the basis of the acceleration component Gy of the vehicle in its rightward or leftward direction which is measured by the acceleration sensor 2; and The form (3) of adjusting the amount of return Δθs on the basis of the velocity component Vy calculated by the velocity component calculating unit 3b.

First, the form (1) will be explained.

The form (1) of adjusting the amount of return Δθs on the basis of the acceleration component extracted by the BPF 21a.

This form (1) will be explained with reference to above-mentioned FIGS. 3 and 4. In the explanation with reference to these FIGS. 3 and 4, the duplication of the above explanation will be omitted.

In a case in which an acceleration component (FIG. 3(b)) in a preset specific oscillation region is extracted from the acceleration component Gy by the BPF 21a and this extracted acceleration component (unnecessary component) exceeds a threshold Ba, like in a case in which the vehicle is travelling on a rough road, the integrator 21c adjusts the amount of return Δθs to be larger with increase in the acceleration component exceeding this threshold Ba.

While thus adjusting the amount of return Δθs, the integrator 21c calculates the angle component θo by integrating with respect to time the angular velocity ω inputted from the angular velocity sensor 1, and carries out the return processing of returning the integral value to zero using the above-mentioned adjusted amount of return Δθs after a lapse of a fixed time interval after carrying out the calculation.

The above-mentioned angle component θo can be shown by "θo=∫ωdt−Δθ(Gy,Gz)."

In the above-mentioned time integration done by the integrator 21c, as shown in FIG. 3(d), as the amount of return which is adjusted becomes larger, the angle component θo becomes smaller and the integration is further suppressed. For example, in a case in which the integral waveform C1 shown in FIG. 3(d) is an assumed one which is obtained by directly integrating with respect to time the angular velocity ω inputted from the angular velocity sensor 1 in a state in which the amount of return is not adjusted to be larger, the actually-integrated result obtained by the integrator 21c has an integral waveform C2 in which the amount of return is adjusted to be larger and on which integration suppression is therefore performed. The degree of this integration suppression becomes larger as the unnecessary acceleration component extracted by the BPF 21a becomes larger. Thus, a signal indicating the angle component θo which is the output of the integrator 21c on which integration suppression is performed is inputted to the multiplier 4b of the judging means 4 (the explanation of subsequent processing will be omitted).

In contrast, at the time of occurrence of a rollover, the component can hardly be extracted by the BPF 21a, and therefore the extracted component does not reach the threshold Ba. Therefore, the integrator 21c calculates the angle component θo by integrating with respect to time the angular velocity ω inputted from the angular velocity sensor 1 without adjusting the amount of return to be larger. Because the amount of return is not adjusted to be larger, this angle component θo becomes the one of an integral waveform C4 having a larger value than the angle component θo of an integral waveform C2 (FIG. 3(d)) (θo of C4>θo of C2) without being subjected to any integration suppression, as shown in FIG. 4(d). In this way, at the time of occurrence of a rollover, the angle component θo having a larger value, as compared with that at the time of the vehicle's travelling on a rough road, is outputted from the integrator 21c. The outputted signal indicating the angle component θo is inputted to the multiplier 4b of the judging means 4.

Next, the form (2) will be explained.

The form (2) of adjusting the amount of return Δθs on the basis of the acceleration component Gy of the vehicle in its rightward or leftward direction which is measured by the acceleration sensor 2.

This form (2) will be explained with reference to above-mentioned FIG. 5.

Assume that, for example, as in the case of Embodiment 1, the angular velocity ω of FIG. 5(a) is measured by the angular velocity sensor 1, while the acceleration component Gy of FIG. 5(c) is measured by the acceleration sensor 2. When the waveform C12 of this measured acceleration component Gy exceeds a threshold Ga, it is judged that the vehicle has been rolling over, and the angular velocity ω during an occurrence interval A and the angular velocity ω during an occurrence interval B (FIG. 5(a)) are handled as an identical event.

Therefore, the integrator 21c adjusts the amount of return to be smaller with increase in the acceleration component Gy exceeding the threshold Ga. In the state in which the integrator 21c thus adjusts the amount of return to be smaller, the integrator integrates with respect to time the angular velocity ω inputted from the angular velocity sensor 1 so as to calculate the angle component θo. The angle component θo which is calculated in this way has an integral waveform as shown in the chart of FIG. 5(d), and has a large value. This angle component θo having a large value is inputted to the multiplier 4b of the judging means 4.

Next, the form (3) will be explained.

The form (3) of adjusting the amount of return Δθs on the basis of the velocity component Vy calculated by the velocity component calculating unit 21b.

This form (3) will be explained also with reference to above-mentioned FIG. 5.

Assume that, for example, as in the case of Embodiment 1, the angular velocity ω of FIG. 5(a) is measured by the angular velocity sensor 1, while the acceleration component Gy of FIG. 5(c) is measured by the acceleration sensor 2.

The velocity component calculating unit 21b integrates with respect to time the measured acceleration component Gy mentioned above so as to calculate the velocity component Vy.

When the waveform C12 of this calculated velocity component Vy exceeds a threshold Va, it is judged that the vehicle has been rolling over, and the angular velocity ω during an occurrence interval A and the angular velocity ω during an occurrence interval B (FIG. 5(a)) are handled as an identical event.

Therefore, the integrator 21c adjusts the amount of return to be smaller with increase in the velocity component Vy exceeding the threshold Va. In the state in which the integrator 21c adjusts the amount of return to be smaller, the integrator integrates with respect to time the angular velocity ω inputted from the angular velocity sensor 1 so as to calculate the angle component θo. The angle component θo calculated in this way has a waveform as shown in the chart of FIG. 5(d), and has a large value. This angle component θo having a large value is inputted to the multiplier 4b of the judging means 4.

Next, concrete adjustment examples of the amount of return in each of the above-mentioned forms (1) to (3) will be explained with reference to FIG. 9.

Figure 9:
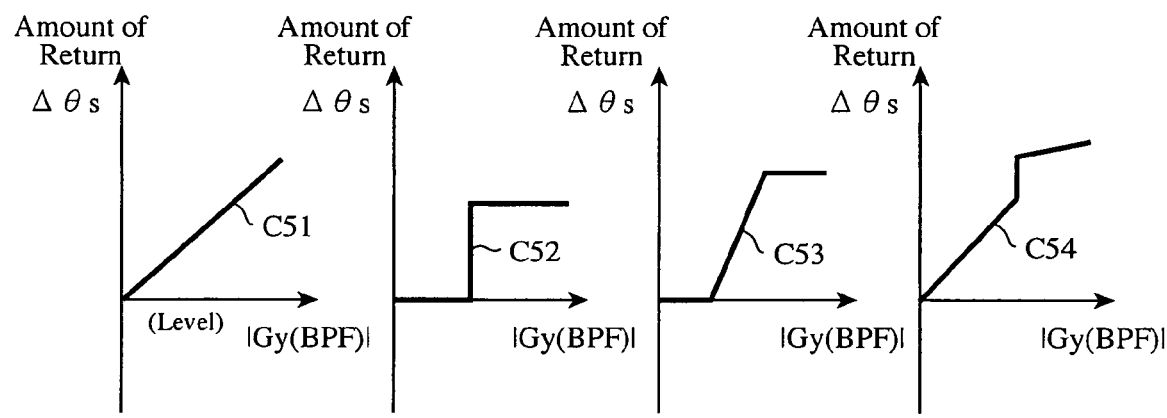
FIG. 9 is a relation diagram showing examples of adjustment of the amount of returns in the rollover judging device in accordance with Embodiment 2 of the present invention.
Figure 9:
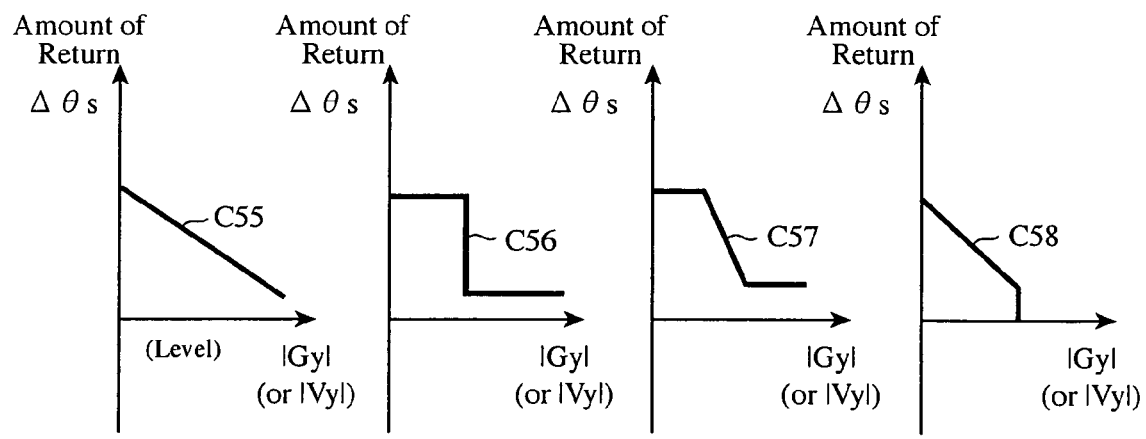

FIG. 9 is a relation diagram showing the examples of the adjustment of the amount of return, FIG. 9(a) is a relation diagram showing a relation between the absolute value level of the acceleration component extracted by the BPF 21a and the amount of return Δθs, and FIG. 6(b) is a relation diagram showing a relation between the absolute value level of the acceleration component Gy (or Vy) measured by the acceleration sensor 2 and the amount of return Δθs.

The examples of adjusting the amount of return Δθs according to the level of the acceleration component extracted by the BPF 21a are implemented according to, for example, characteristic patterns C51 to C54 as shown in FIG. 9(a), respectively. The characteristic patterns C51 to C54 substantially show an overall tendency for the amount of return to be adjusted to be larger according to the level of the acceleration component extracted by the BPF 21a.

The examples of adjusting the amount of return according to the acceleration component Gy measured by the acceleration sensor 2 are implemented according to, for example, characteristic patterns C55 to C58 as shown in FIG. 9(b), respectively. These characteristic patterns substantially show an overall tendency for the amount of return to be adjusted to be smaller according to the magnitude of the acceleration component Gy.

The examples (examples of (3)) of adjusting the amount of return according to the velocity component Vy calculated by the velocity component calculating unit 21b can be understood by replacing the acceleration Gy on the horizontal axis of above-mentioned FIG. 9(b) with the velocity Vy.

Which one of the characteristic patterns C51 to C58 mentioned above is selected can be arbitrarily determined.

Next, a relation between this Embodiment 2 and FIG. 7 showing the above-mentioned handling of different events (events) as an identical event will be explained.

The description explained with reference to FIG. 7 is applied also to the structure of this Embodiment 2.

As shown in FIG. 7, in a case in which intervals (Ta and Tc) with adjustment of the amount of return during each of which a waveform C41 having a BPF value, a G value, or a V value exceeds a threshold K, and an interval (Tb) without adjustment of the amount of return during which the waveform is less than the threshold K appear alternately (FIG. 7(a)), the integration processing means 3 judges that they result from an identical event, and, as shown in FIG. 7(b), carries out processes in such a manner as to extend the interval with adjustment of the amount of return by a fixed time interval Ts after the interval with adjustment is completed. As a result, the interval extending from the start of the interval Ta with adjustment to the end of the fixed time interval Ts becomes a continuous interval with adjustment, and an interval which appears after the fixed time interval Ts is completed becomes an interval without adjustment.

As a result, also with the structure of this Embodiment 2, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

In each of the forms (1) to (3) previously explained, the acceleration component Gy of the vehicle in its rightward or leftward direction is measured by the acceleration sensor 2. Also in this Embodiment 2, the acceleration component of the vehicle measured by the acceleration sensor is not limited to this acceleration component Gy, and the acceleration component of the vehicle in its upward or downward direction can be alternatively measured.

As mentioned above, in accordance with this Embodiment 2, the integration processing means 21 is disposed instead of the integration processing means 3 of Embodiment 1, and the integrator 21c which constructs this integration processing means 21 is so constructed as to adjust the amount of return $\Delta\theta s$ which is used for the integral value return-to-zero processing on the basis of the acceleration component of the vehicle in its rightward or leftward direction which is measured by the acceleration sensor 2, calculate the angle component $\theta o$ by integrating with respect to time the angular velocity $\omega$ measured by the angular velocity sensor 1, and carry out the return processing of returning the integral value to zero using the above-mentioned adjusted amount of return $\Delta\theta s$ after a lapse of a fixed time interval after carrying out the calculation. Therefore, this Embodiment 2 offers the same advantages as those provided by Embodiment 1. These advantages are summarized as follows:

The rollover judging device can judge whether or not the vehicle is rolling over with a simple structure without using complicated processing such as processing based on a conventional two-dimensional mapping method. In other words, the arithmetic processing is simplified without taking much time to be performed, unlike in the case of the above-mentioned conventional example. As a result, the speeding up of the arithmetic processing and reduction in the power consumption, or reduction in the load on a CPU in a case of using the CPU for the structure of FIG. 2, and simplification of the judgment algorithm result in an improvement in the reliability of the rollover judging device.

In addition, because the threshold Th which is used as a criterion of the judgment of whether or not the vehicle is rolling over is preset as a fixed value, as in the case of Embodiment 1, the arithmetic logic can be simplified, and therefore the arithmetic processing can be speeded up and the reliability of the rollover judging device can be improved. Furthermore, this fixation of the threshold results in a smaller number of times that comparison for the judgment is carried out, and therefore the judgment of whether or not the vehicle is rolling over can be implemented by using a simple method.

In addition, because the BPF 21a which has the same functions as the BPF 3a of Embodiment 1 is disposed in the integration processing means 21, and, when the unnecessary component extracted has a magnitude larger than a predetermined threshold, the rollover judging device judges that the vehicle is travelling on a rough road and then adjusts the amount of return $\Delta\theta s$ to be larger according to the magnitude of this unnecessary component, the rollover judging device can suppress the time integration done by the integrator 21c, and can extract only conditions with a high degree of severity as the rollover mode.

As for the above-mentioned BPF 3a, because the vehicle oscillates in its rightward or leftward direction or in its upward or downward direction at an oscillation frequency specific to the vehicle when the vehicle is in the rough road traveling mode in which angular velocity components in different axis directions coexist, the rollover judging device calculates the magnitude of the oscillation component using the BPF 3a, and, when the magnitude of the calculated oscillation component is large, judges that the vehicle is in the rough road traveling mode, and increases the amount of return $\Delta\theta s$ so as to suppress the time integration.

Furthermore, when the above-mentioned acceleration component is larger than the predetermined threshold, the rollover judging device can increase the rate of the time integration done by the integrator 3d by adjusting the amount of return $\Delta\theta s$ to be smaller according to the magnitude of this acceleration component, and can extract only conditions with a high degree of severity as the rollover mode.

As for the above-mentioned acceleration component, when the acceleration of the vehicle in its rightward or leftward direction or in its upward or downward direction is large, because there is a high probability that passengers are moved to one side of the vehicle and are thrown out of the vehicle, the rollover judging device decreases the amount of return $\Delta\theta s$ and also increases the rate of the time integration so as to expand the air bag at an earlier timing when the acceleration of the vehicle in its rightward or leftward direction or in its upward or downward direction is large.

In addition, the velocity component calculating unit 21b which has the same functions as the velocity component calculating unit 3b of Embodiment 1 is disposed in the integration processing means 21, and, when the velocity component calculated is larger than a predetermined threshold, the rollover judging device can increase the rate of the time integration done by the integrator 21c by adjusting the amount of return $\Delta\theta s$ to be smaller according to the magnitude of this velocity component, and can extract only conditions with a high degree of severity as the rollover mode.

Also as for the above-mentioned velocity component, from the same reason as that in the case of the above-mentioned acceleration component, the rollover judging device decreases the amount of return $\Delta\theta s$ and also increases the rate of the time integration so as to expand the air bag at an earlier timing.

In addition, the structure of this Embodiment 2 is the same as that of Embodiment 1 except for the integration processing means 21, and therefore, also in this Embodiment 2, the severity of the rollover phenomenon can be expressed using a simple percentage.

Furthermore, when the unnecessary component extracted by the BPF 21a is larger than the predetermined threshold, because the rollover judging device continues the state in which it adjusts the amount of return to be larger for a fixed time interval after this unnecessary component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

In addition, when the above-mentioned acceleration component is larger than the predetermined threshold, because the rollover judging device continues the state in which it adjusts the amount of return to be smaller for a fixed time interval after this acceleration component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

Furthermore, when the above-mentioned velocity component is larger than the predetermined threshold, because the rollover judging device continues the state in which it adjusts the amount of return to be smaller for a fixed time interval after this velocity component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

Embodiment 3

Figure 10:
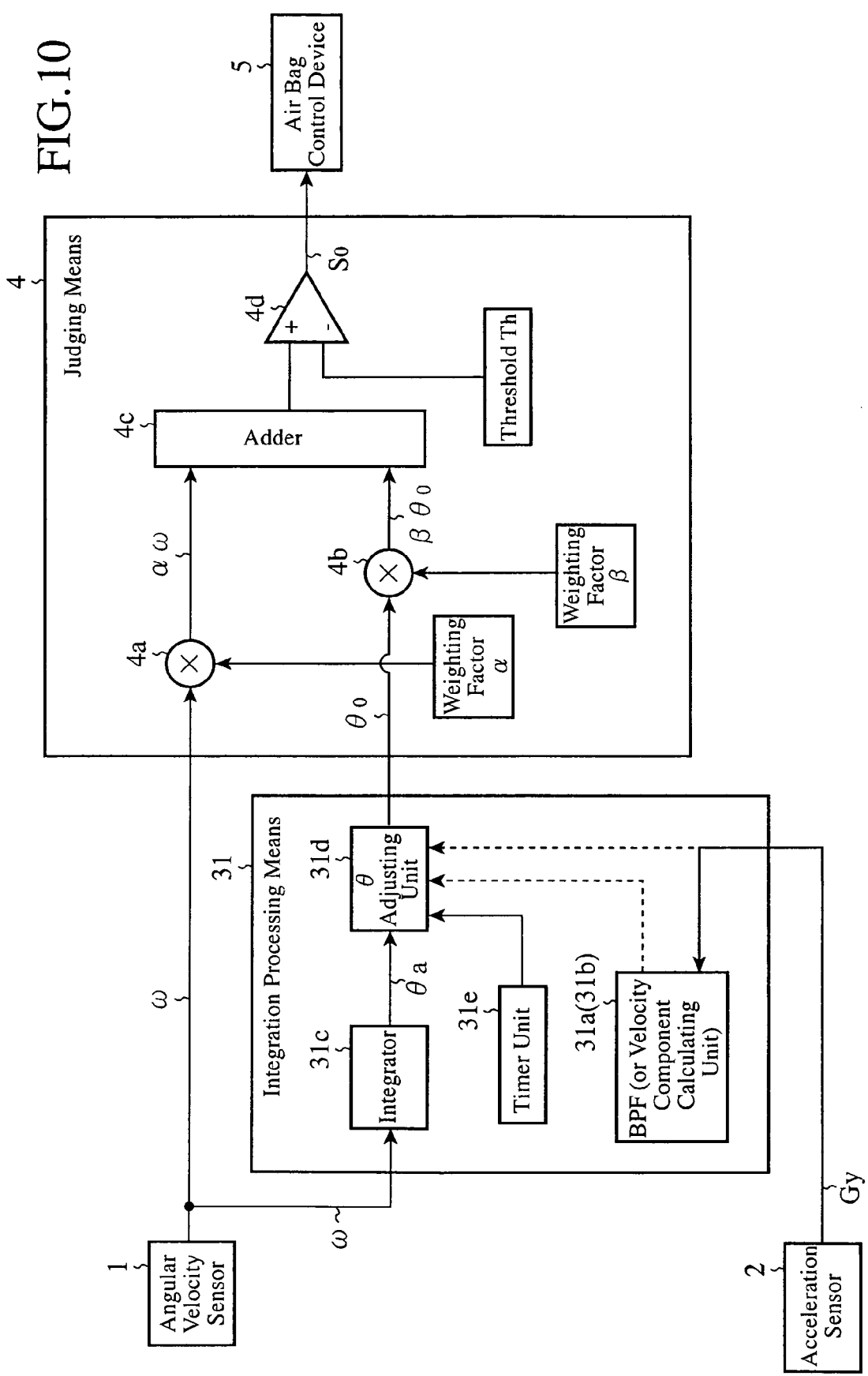
FIG. 10 is a block diagram showing the structure of a rollover judging device in accordance with Embodiment 3 of the present invention.

FIG. 10 is a block diagram showing the structure of a rollover judging device in accordance with Embodiment 3 of the present invention. The same components as those shown in FIG. 1 are designated by the same reference characters, respectively.

In FIG. 10, the structure shown in this figure differs from that shown in FIG. 1 in that an integration processing means 31 is disposed instead of the integration processing means 3 of FIG. 1, and the other components are the same as those of the structure of FIG. 1.

The integration processing means 31 of this FIG. 10 adjusts an angle component on which integration processing has been performed according to the occurrence pattern of the acceleration component Gy of the vehicle in its rightward or leftward direction which is measured by the acceleration sensor 2.

Therefore, in the following explanation, the integration processing means 31 which is the above-mentioned difference will be mainly explained and the explanation of the other components designated by the same reference characters as those shown in FIG. 1 will be omitted.

The integration processing means 31 calculates the angle component θo on the basis of the angular velocity ω inputted from the angular velocity sensor 1, and is comprised of a BPF 31a (or a velocity component calculating unit 31b), an integrator 31c, an angle component adjusting unit (referred to as a "θ adjusting unit" from here on) 31d, and a timer unit 21e.

Among these components, the BPF 31a (or the velocity component calculating unit 31b), the integrator 31c, and the timer unit 31e have the same functions as the BPF 3a (or the velocity component calculating unit 3b), the integrator 3d, and the timer unit 3e of FIG. 1, respectively, and the explanation of these components will be omitted hereafter.

The θ adjusting unit 31d adjusts the rate or absolute value of the angle component θa which is calculated by integrating with respect to time the angular velocity ω by using the integrator 3d on the basis of the acceleration component Gy of the vehicle in its rightward or leftward direction which is measured by the acceleration sensor 2, and outputs the rate or absolute value of the angle component as the angle component θo.

Next, the operation of the integration processing means 31 of FIG. 10 will be explained.

As mentioned above, this integration processing means 31 adjusts the magnitude of the angle component θa calculated by the integrator 31c on the basis of the acceleration component Gy measured by the acceleration sensor 2 by using the θ adjusting unit 31d, and outputs the adjusted magnitude as the angle component θo. FIG. 10 shows a structure of carrying out a rollover judgment using the angle component θo calculated by this integration processing means 31.

As adjustment forms of the magnitude of the above-mentioned angle component θa, there are the following forms (1) to (3), as in the case of Embodiment 1.

The form (1) of adjusting the rate or absolute value of the angle component θa on the basis of the acceleration component extracted by the BPF 3a;

The form (2) of adjusting the rate or absolute value of the angle component θa on the basis of the acceleration component Gy of the vehicle in its rightward or leftward direction which is measured by the acceleration sensor 2; and The form (3) of adjusting the rate or absolute value of the angle component θa on the basis of the velocity component Vy calculated by the velocity component calculating unit 3b.

First, the form (1) will be explained.

The form (1) of adjusting the rate or absolute value of the angle component θa on the basis of the acceleration component extracted by the BPF 3a.

This form (1) will be explained with reference to above-mentioned FIGS. 3 and 4.

In the explanation with reference to these FIGS. 3 and 4, the duplicated part of the above explanation will be omitted.

In a case in which an acceleration component (FIG. 3(b)) in a preset specific oscillation region is extracted from the acceleration component Gy by the BPF 31a and this extracted acceleration component (unnecessary component) exceeds a threshold Ba, like in a case in which the vehicle is travelling on a rough road, the θ adjusting unit 31d adjusts the angle component θa to be smaller with increase in the acceleration component exceeding this threshold Ba. This adjustment is thus equivalent to the integration processing means 31 making suppression of the integration as a whole even if the integration processing means is in a state in which it adjusts the angle component θa on which it has performed the time integration processing by using the integrator 31c, and therefore the output θo has an integral waveform C2 on which the integration suppression as shown in FIG. 3(d) is performed. The suppression degree of this integration suppression becomes larger with increase in the unnecessary acceleration component extracted by the BPF 31a. A signal indicating the angle component θo on which the integration suppression is performed in this way is inputted to the multiplier 4b of the judging means 4.

In contrast, at the time of occurrence of a rollover, the component can hardly be extracted by the BPF 31a, and therefore the extracted component does not reach the threshold Ba. Therefore, the θ adjusting unit 31d outputs the angle component θa inputted thereto as "θo=θaω" without adjusting the angle component. The outputting of the angle component θa as θo without adjusting it is thus equivalent to the integration processing means 31 not carrying out any integration suppression as a whole, the output θo becomes the angle component θo having an integral waveform C4 with a larger value than the angle component θo having an integral waveform C2 (FIG. 3(d)) (θo of C4>θo of C2), as shown in FIG. 4(d). Thus, at the time of occurrence of a rollover, the angle component θo having a larger value compared with that at the time of the vehicle travelling on a rough road is outputted from the θ adjusting unit 31d. A signal indicating the outputted angle component θo is inputted to the multiplier 4b of the judging means 4.

A judgment equation for the judging means 4 in accordance with this Embodiment 3 can be shown as follows:

$$|\alpha\omega+\beta\theta o|>|Th| \quad \text{Judgment equation}$$

Next, the form (2) will be explained.

The form (2) of adjusting the rate or absolute value of the angle component θa on the basis of the acceleration component Gy of the vehicle in its rightward or leftward direction which is measured by the acceleration sensor 2. This form (2) will be explained with reference to above-mentioned FIG. 5.

Assume that, for example, as in the case of Embodiment 1, the angular velocity ω of FIG. 5(a) is measured by the angular velocity sensor 1, while the acceleration component Gy of FIG. 5(c) is measured by the acceleration sensor 2.

When the waveform C12 of this measured acceleration component Gy exceeds a threshold Ga, it is judged that the vehicle has been rolling over, and the angular velocity ω during an occurrence interval A and the angular velocity ω during an occurrence interval B (FIG. 5(a)) are handled as an identical event.

Therefore, the θ adjusting unit 31d adjusts the angle component θa to be larger with increase in the acceleration component Gy exceeding the threshold Ga, and outputs it as the angle component θo. The angle component θo which is adjusted and outputted in this way has a waveform as shown in the chart of FIG. 5(d), and has a large value. This angle component θo having a large value is inputted to the multiplier 4b of the judging means 4.

Next, the form (3) will be explained.

The form (3) of adjusting the rate or absolute value of the angle component θa on the basis of the velocity component Vy calculated by the velocity component calculating unit 3b.

This form (3) will be explained also with reference to above-mentioned FIG. 5.

Assume that, for example, as in the case of Embodiment 1, the angular velocity ω of FIG. 5(a) is measured by the angular velocity sensor 1, while the acceleration component Gy of FIG. 5(c) is measured by the acceleration sensor 2.

The velocity component calculating unit 31b integrates with respect to time the measured acceleration component Gy mentioned above so as to calculate the velocity component Vy.

When the waveform C12 of this calculated velocity component Vy exceeds a threshold Va, it is judged that the vehicle has been rolling over, and the angular velocity ω during an occurrence interval A and the angular velocity ω during an occurrence interval B (FIG. 5(a)) are handled as an identical event.

Therefore, the θ adjusting unit 31d adjusts the angle component θa to be larger with increase in the velocity component Vy exceeding the threshold Va, and outputs it as the angle component θo. The angle component θo which is adjusted and outputted in this way has a waveform as shown in the chart of FIG. 5(d), and has a large value. This angle component θo having a large value is inputted to the multiplier 4b of the judging means 4.

Next, concrete adjustment examples of the angle component θo in each of the above-mentioned forms (1) to (3) will be explained.

These concrete adjustment examples of the angle component θa can be understood by changing the vertical and/or horizontal axis in each of relation diagrams shown in above-mentioned FIGS. 6(a) to 6(d) as follows:

The vertical axis of FIG. 6(a) is replaced by an axis which represents the rate (rate (%)) of the angle component θo which is the adjusted output.

In this case, the following relation: "θo=θa×rate" is established.

The vertical axis of FIG. 6(b) is replaced by an axis which represents Δθ indicating the level of the angle component θo which is the adjusted output.

In this case, the following relation: "θo=θa−Δθ" is established, where "Δθ" shows an amount of angle adjustment in the θ adjusting unit 31d, and corresponds to the above-mentioned Δω.

The vertical axis of FIG. 6(c) is replaced by an axis which represents the rate (rate) of the angle component θo which is the adjusted output, and the horizontal axis is replaced by an axis which represents the acceleration Gy (absolute value) or the velocity Vy (absolute value). The "rate" on the vertical axis is the same as that in the case of above-mentioned FIG. 6(a).

The vertical axis of FIG. 6(d) is replaced by an axis which represents Δθ indicating the level of the angle component θo which is the adjusted output, and the horizontal axis is replaced by an axis which represents the acceleration Gy or the velocity Vy.

In this case, the following relation: "θo=θa+Δθ" is established, where "Δθ" is the same as that in the case of above-mentioned FIG. 6(b).

An arbitrary characteristic can be sleeted from among characteristics C21 to C36 shown in the relation diagrams in each of which the replacement is made as mentioned above.

Next, a relation between this Embodiment 3 and FIG. 7 showing the above-mentioned handling of different events (events) as an identical event will be explained.

The description explained with reference to FIG. 7 is applied also to the structure of this Embodiment 3.

As shown in FIG. 7, in a case in which intervals (Ta and Tc) with adjustment of the angle component during each of which a waveform C41 having a BPF value, a G value, or a V value exceeds a threshold K, and an interval (Tb) without adjustment of the angle component during which the waveform is less than the threshold K appear alternately (FIG. 7(a)), the integration processing means 3 judges that they result from an identical event, and, as shown in FIG. 7(b), carries out processes in such a manner as to extend the interval with adjustment of the angle component by a fixed time interval Ts after the interval with adjustment is completed. As a result, the interval extending from the start of the interval Ta with adjustment to the end of the fixed time interval Ts becomes a continuous interval with adjustment, and an interval which appears after the fixed time interval Ts is completed becomes an interval without adjustment.

As a result, also with the structure of this Embodiment 3, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

In each of the forms (1) to (3) previously explained, the acceleration component Gy of the vehicle in its rightward or leftward direction is measured by the acceleration sensor 2. Also in this Embodiment 3, the acceleration component of the vehicle measured by the acceleration sensor is not limited to this acceleration component Gy, and the acceleration component of the vehicle in its upward or downward direction can be alternatively measured.

As mentioned above, in accordance with this Embodiment 3, the integration processing means 31 is disposed instead of the integration processing means 3 or Embodiment 1, and this integration processing means 31 is so constructed as to calculate the angle component θa by integrating with respect to time the angular velocity component ω measured by the angular velocity sensor 1, adjust the magnitude of this angle component θa on the basis of the acceleration component measured by the acceleration sensor 2, and output the adjusted angle component θo. Therefore, this Embodiment 3 can offer the same advantages as those provided by Embodiment 1. These advantages are summarized as follows:

The rollover judging device can judge whether or not the vehicle is rolling over with a simple structure without using complicated processing such as processing based on a conventional two-dimensional mapping method, and, with a simplification of the arithmetic processing, can provide the speeding up of the arithmetic processing and reduction in the power consumption, or reduction in the load on a CPU in a case of using the CPU for the structure of FIG. 3. Furthermore, the rollover judging device can provide an improvement in the reliability thereof with a simplification of the judgment algorithm.

In addition, because the threshold Th which is used as a criterion of the judgment is preset as a fixed value, as in the case of Embodiment 1, the arithmetic logic can be simplified, and therefore the arithmetic processing can be speeded up and the reliability of the rollover judging device can be improved. Furthermore, this fixation of the threshold results in a smaller number of times that comparison for the judgment is carried out, and therefore the judgment of whether or not the vehicle is rolling over can be implemented by using a simple method.

In addition, because the BPF 31a which has the same functions as the BPF 3a of Embodiment 1 is disposed in the integration processing means 31, and, when the unnecessary component extracted has a magnitude larger than a predetermined threshold, the rollover judging device judges that the vehicle is travelling on a rough road and then adjusts the angle component θa to be smaller according to the magnitude of this unnecessary component, the rollover judging device can suppress the time integration as the whole of the integration processing means 31, and can extract only conditions with a high degree of severity as the rollover mode.

Furthermore, when the above-mentioned acceleration component is larger than the predetermined threshold, the rollover judging device can increase the rate of the time integration as the whole of the integration processing means 31 by adjusting the angle component θa to be larger according to the magnitude of this acceleration component, and can extract only conditions with a high degree of severity as the rollover mode.

In addition, the velocity component calculating unit 31b which has the same functions as the velocity component calculating unit 3b of Embodiment 1 is disposed in the integration processing means 31, and, when the velocity component calculated is larger than a predetermined threshold, the rollover judging device can increase the rate of the time integration as the whole of the integration processing means 31 by adjusting the angle component θa to be larger according to the magnitude of this velocity component, and can extract only conditions with a high degree of severity as the rollover mode.

The structure of this Embodiment 2 is the same as that of Embodiment 1 except for the integration processing means 31, and therefore, also in this Embodiment 3, the severity of the rollover phenomenon can be expressed using a simple percentage.

Furthermore, when the unnecessary component extracted by the BPF 31a is larger than the predetermined threshold, because the rollover judging device continues the state in which it adjusts the angle component θa to be smaller for a fixed time interval after this unnecessary component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

In addition, when the above-mentioned acceleration component is larger than the predetermined threshold, because the rollover judging device continues the state in which it adjusts the angle component θa to be larger for a fixed time interval after this acceleration component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

Furthermore, when the above-mentioned velocity component is larger than the predetermined threshold, because the rollover judging device continues the state in which it adjusts the angle component θa to be larger for a fixed time interval after this velocity component becomes smaller than this threshold, even when events which can be assumed to occur separately result from an identical event in actuality, the rollover judging device can deal with the events appropriately without carrying out discontinuous processing, thereby improving the accuracy of the judgment of whether or not the vehicle is being in a rollover state.

INDUSTRIAL APPLICABILITY

As mentioned above, the rollover judging device in accordance with the present invention is suitable for use in an airbag control unit which carries out control of expansion of an air bag used for passenger protection when the vehicle enters a rollover state, and so on, because the rollover judging device can carry out judgment of whether or not the vehicle is rolling over with a simple structure by adjusting the magnitude of the angular velocity component of the vehicle on the basis of the measured angular velocity component and the acceleration component, carrying predetermined multiplication and addition processes on the basis of the angle component which the rollover judging device has acquired by integrating with respect to time the angular velocity component, and outputting a signal indicating judgment of a rollover when a preset threshold is exceeded.

The invention claimed is:

1. A rollover judging device comprising:
an angular velocity sensor for measuring an angular velocity component of a vehicle in a direction of a rollover of the vehicle;
an acceleration sensor for measuring either of at least an acceleration component of the vehicle in a rightward or leftward direction and an acceleration component of the vehicle in an upward or downward direction;
an integration processor for adjusting a magnitude of the angular velocity component measured by said angular velocity sensor on a basis of the acceleration component measured by said acceleration sensor, and for calculating an angle component by integrating with respect to time said adjusted angular velocity component; and
a judging unit for multiplying the angular velocity component measured by said angular velocity sensor and the angle component calculated by said integration processor by preset weighting factors, respectively, and for outputting a signal indicating judgment of occurrence of a rollover when an absolute value of a sum of said components multiplied by the preset weighting factors, respectively, exceeds a preset threshold.

2. The rollover judging device according to claim 1,
wherein the integration processor includes a filter for extracting an acceleration component in a preset specific oscillation region from the acceleration component measured by the acceleration sensor,
wherein said integration processor adjusts the angular velocity component based on a magnitude of said extracted acceleration component such that the integration processor reduces the angular velocity component when the acceleration component extracted by said filter is larger than a preset threshold.

3. The rollover judging device according to claim 2,
wherein the integration processor includes a timer unit for measuring a preset fixed time interval, and,
wherein the integration processor continues a state in which it reduces the angular velocity component for said fixed time interval after said acceleration component becomes smaller than said threshold.

4. The rollover judging device according to claim 1, wherein the integration processor adjusts the angular velocity component based on a magnitude of said measured acceleration component such that the integration processor increases the angular velocity component when the acceleration component measured by the acceleration sensor is larger than a preset threshold.

5. The rollover judging device according to claim 4,
wherein the integration processor includes a timer unit for measuring a preset fixed time interval, and,
wherein the integration processor continues a state in which it increases the angular velocity component for said fixed time interval after said acceleration component becomes smaller than said threshold.

6. The rollover judging device according to claim 1,
wherein the integration processor includes a velocity component calculating unit for calculating a velocity component by integrating with respect to time the acceleration component measured by the acceleration sensor, and,
wherein said integration processor adjusts the angular velocity component based on a magnitude of said calculated velocity component such that the integration processor increases the angular velocity component when the velocity component calculated by the velocity component calculating unit is larger than a preset threshold.

7. The rollover judging device according to claim 6,
wherein the integration processor includes a timer unit for measuring a preset fixed time interval, and,
wherein the integration processor continues a state in which it increases the angular velocity component for said fixed time interval after said velocity component becomes smaller than said threshold.

8. A rollover judging device comprising:
an angular velocity sensor for measuring an angular velocity component of a vehicle in a direction of a rollover of the vehicle;
an acceleration sensor for measuring either of at least an acceleration component of the vehicle in a rightward or leftward direction and an acceleration component of the vehicle in an upward or downward direction;
an integration processor for adjusting an amount of return used for integral value return-to-zero processing on a basis of the acceleration component measured by said acceleration sensor, for calculating an angle component by integrating with respect to time the angular velocity component measured by said angular velocity sensor, and for carrying out a process of returning an integral value obtained through said time integration to zero using said adjusted amount of return after a lapse of a fixed time interval after the calculation; and
a judging unit for multiplying the angular velocity component measured by said angular velocity sensor and the angle component calculated by said integration processor by preset weighting factors, respectively, and for outputting a signal indicating judgment of occurrence of a rollover when an absolute value of a sum of said components multiplied by the preset weighting factors, respectively, exceeds a preset threshold.

9. The rollover judging device according to claim 8, wherein when performing the process of returning the integral value obtained through said time integration to zero, the integration processor subtracts the adjusted amount of return from said integral value when said integral value is positive, whereas when said integral value is negative, the integration processor adds the adjusted amount of return to said integral value.

10. The rollover judging device according to claim 8,
wherein the integration processor includes a filter for extracting an acceleration component in a preset specific oscillation region from the acceleration component measured by the acceleration sensor, and,
wherein said integration processor adjusts the amount of return based on a magnitude of said extracted acceleration component such that the integration processor increases the amount of return when the acceleration component extracted by said filter is larger than a preset threshold.

11. The rollover judging device according to claim 10,
wherein the integration processor includes a timer unit for measuring a preset fixed time interval, and,
wherein the integration processor continues a state in which it increases the amount of return for said fixed time interval after said acceleration component becomes smaller than said threshold.

12. The rollover judging device according to claim 8, wherein the integration processor adjusts the amount of return based on a magnitude of said measured acceleration component, such that the integration processor reduces the amount of return when the acceleration component measured by the acceleration sensor is larger than a preset threshold.

13. The rollover judging device according to claim 12, wherein the integration processor includes a timer unit for measuring a preset fixed time interval, and, wherein the integration processor continues a state in which it reduces the amount of return for said fixed time interval after said acceleration component becomes smaller than said threshold.

14. The rollover judging device according to claim 8, wherein the integration processor includes a velocity component calculating unit for calculating a velocity component by integrating with respect to time the acceleration component measured by the acceleration sensor, and, wherein said integration processor adjusts the amount of return based on a magnitude of said calculated velocity component such that the integration processor reduces the amount of return when the velocity component calculated by the velocity component calculating unit is larger than a preset threshold.

15. The rollover judging device according to claim 14, wherein the integration processor includes a timer unit for measuring a preset fixed time interval, and, wherein the integration processor continues a state in which it reduces the amount of return for said fixed time interval after said velocity component becomes smaller than said threshold.

16. A rollover judging device comprising:

an angular velocity sensor for measuring an angular velocity component of a vehicle in a direction of a rollover of the vehicle;

an acceleration sensor for measuring either of at least an acceleration component of the vehicle in a rightward or leftward direction and an acceleration component of the vehicle in an upward or downward direction;

an integration processor for calculating an angle component by integrating with respect to time the angular velocity component measured by said acceleration sensor, and for adjusting a magnitude of said calculated angle component on a basis of the acceleration component measured by said acceleration sensor, and for outputting said adjusted angle component; and a judging unit for multiplying the angular velocity component measured by said angular velocity sensor and the angle component calculated by said integration processor by preset weighting factors, respectively, and for outputting a signal indicating judgment of occurrence of a rollover when an absolute value of a sum of said components multiplied by the preset weighting factors, respectively, exceeds a preset threshold.

17. The rollover judging device according to claim 16, wherein the integration processor includes a filter for extracting an acceleration component in a preset specific oscillation region from the acceleration component measured by the acceleration sensor, and, wherein said integration processor adjusts the angle component based on a magnitude of said extracted acceleration component such that the integration processor reduces the angle component when the acceleration component extracted by said filter is larger than a preset threshold.

18. The rollover judging device according to claim 17, wherein the integration processor includes a timer unit for measuring a preset fixed time interval, and, wherein said integration processor continues a state in which it reduces the angle component for said fixed time interval after said acceleration component becomes smaller than said threshold.

19. The rollover judging device according to claim 16, wherein the integration processor adjusts the angle component based on a magnitude of said measured acceleration component such that the integration processor increases the angle component when the acceleration component measured by the acceleration sensor is larger than a preset threshold.

20. The rollover judging device according to claim 19, wherein the integration processor includes a timer unit for measuring a preset fixed time interval, and, wherein said integration processor continues a state in which it increases the angle component for said fixed time interval after said acceleration component becomes smaller than said threshold.

21. The rollover judging device according to claim 16, wherein the integration processor includes a velocity component calculating unit for calculating a velocity component by integrating with respect to time the acceleration component measured by the acceleration sensor, and, wherein said integration processor adjusts the angle component based on a magnitude of said calculated velocity component such that the integration processor increases the angle component when the velocity component calculated by the velocity component calculating unit is larger than a preset threshold.

22. The rollover judging device according to claim 21, wherein the integration processor includes a timer unit for measuring a preset fixed time interval, and, wherein said integration processor continues a state in which it increases the angle component for said fixed time interval after said velocity component becomes smaller than said threshold.

* * * * *